United States Patent
Miller et al.

(10) Patent No.: US 11,536,973 B2
(45) Date of Patent: *Dec. 27, 2022

(54) FIXED-DISTANCE VIRTUAL AND AUGMENTED REALITY SYSTEMS AND METHODS

(71) Applicant: Magic Leap, Inc., Plantation, FL (US)

(72) Inventors: Samuel A. Miller, Hollywood, FL (US); William Hudson Welch, Fort Lauderdale, FL (US)

(73) Assignee: Magic Leap, Inc., Plantation, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/353,434

(22) Filed: Jun. 21, 2021

(65) Prior Publication Data

US 2021/0311319 A1 Oct. 7, 2021

Related U.S. Application Data

(63) Continuation of application No. 16/809,346, filed on Mar. 4, 2020, now Pat. No. 11,073,699, which is a (Continued)

(51) Int. Cl.
*G02B 27/01* (2006.01)
*G06F 3/01* (2006.01)
*G06F 3/0346* (2013.01)

(52) U.S. Cl.
CPC ....... *G02B 27/0172* (2013.01); *G02B 27/017* (2013.01); *G06F 3/011* (2013.01);
(Continued)

(58) Field of Classification Search
CPC .... G02B 2027/0125; G02B 2027/0134; G02B 2027/0138; G02B 2027/014;
(Continued)

(56) References Cited

U.S. PATENT DOCUMENTS 4,462,165 A 7/1984 Lewis
5,280,265 A 1/1994 Kramer et al.
(Continued)

FOREIGN PATENT DOCUMENTS

AU 2017214748 8/2018
AU 2017305227 2/2019
(Continued)

OTHER PUBLICATIONS

Non-Final Office Action for U.S. Appl. No. 14/641,376 dated Apr. 14, 2016.
(Continued)

*Primary Examiner* — Chun-Nan Lin
(74) *Attorney, Agent, or Firm* — Vista IP Law Group, LLP

(57) ABSTRACT

A fixed-distance display system includes a light source configured to generate a light beam. The system also includes a light guiding optical element configured to propagate at least a portion of the light beam by total internal reflection. The system further includes a first inertial measurement unit configured to measure a first value for calculating a head pose of a user. Moreover, the system includes a camera configured to capture an image for machine vision optical flow analysis. The display system is configured to display virtual images only within a tolerance range of a single predetermined optical plane.

12 Claims, 19 Drawing Sheets

Related U.S. Application Data continuation of application No. 15/665,335, filed on Jul. 31, 2017, now Pat. No. 10,649,211.

(60) Provisional application No. 62/370,117, filed on Aug. 2, 2016.

(52) U.S. Cl.
CPC ............ G06F 3/012 (2013.01); G06F 3/0346 (2013.01); *G02B 2027/014* (2013.01); *G02B 2027/0125* (2013.01); *G02B 2027/0134* (2013.01); *G02B 2027/0138* (2013.01); *G02B 2027/0178* (2013.01); *G02B 2027/0181* (2013.01)

(58) Field of Classification Search
CPC ........ G02B 2027/0178; G02B 27/0172; G06F 3/011; G06F 3/012; G06F 3/0346
See application file for complete search history.

(56) References Cited

U.S. PATENT DOCUMENTS

| | | | |
|---|---|---|---|
| 5,583,974 A | 12/1996 | Winner et al. |
| 5,592,401 A | 1/1997 | Kramer |
| 5,684,498 A | 11/1997 | Welch et al. |
| 5,784,115 A | 7/1998 | Bozdagi |
| 5,844,530 A | 12/1998 | Tosaki |
| 5,930,741 A | 7/1999 | Kramer |
| 6,377,401 B1 | 4/2002 | Bartlett |
| 6,407,736 B1 | 6/2002 | Regan |
| 6,701,296 B1 | 3/2004 | Kramer et al. |
| 6,891,533 B1 | 5/2005 | Alcorn et al. |
| 7,375,529 B2 | 5/2008 | Dupuis et al. |
| 7,443,154 B1 | 10/2008 | Merewether et al. |
| 8,165,352 B1 | 4/2012 | Mohanty et al. |
| 8,401,308 B2 | 3/2013 | Nakamura et al. |
| 8,446,426 B2 | 5/2013 | Gonion |
| 8,950,867 B2 | 2/2015 | Macnamara |
| 8,989,775 B2 | 3/2015 | Shaw |
| 9,013,505 B1 | 4/2015 | Thorton |
| 9,160,727 B1 | 10/2015 | Saylor et al. |
| 9,215,293 B2 | 12/2015 | Miller |
| 9,417,452 B2 | 8/2016 | Schowengerdt et al. |
| 9,465,129 B1 | 10/2016 | Olsson et al. |
| 9,639,935 B1 | 5/2017 | Douady-Plevin et al. |
| 9,671,566 B2 | 6/2017 | Abovitz et al. |
| 9,791,700 B2 | 10/2017 | Schowengerdt |
| 9,814,430 B1 | 11/2017 | Berme et al. |
| 9,874,749 B2 | 1/2018 | Bradski et al. |
| 9,952,673 B2 | 4/2018 | Kramer et al. |
| 10,130,429 B1 | 11/2018 | Weir |
| 10,338,677 B2 | 7/2019 | Guenter |
| 10,481,689 B1 | 11/2019 | Jeromin |
| 10,721,280 B1 | 7/2020 | Heppner et al. |
| 10,843,067 B1 | 11/2020 | Peuhkurinen et al. |
| 10,942,252 B2 | 3/2021 | Chen et al. |
| 10,964,119 B2 | 3/2021 | Nourai et al. |
| 11,176,901 B1 | 11/2021 | Hunt et al. |
| 11,315,214 B2 | 4/2022 | Liebenow et al. |
| 2001/0043738 A1 | 11/2001 | Sawney et al. |
| 2002/0033803 A1 | 3/2002 | Holzrichter et al. |
| 2002/0180727 A1 | 12/2002 | Guckenberger et al. |
| 2003/0052965 A1 | 3/2003 | Junkins et al. |
| 2003/0092448 A1 | 5/2003 | Forstrom et al. |
| 2003/0120448 A1 | 7/2003 | Moriya et al. |
| 2003/0234823 A1 | 12/2003 | Sato et al. |
| 2004/0140949 A1* | 7/2004 | Takagi ............... G02B 27/0101 345/8 |
| 2004/0174337 A1 | 9/2004 | Kubota et al. |
| 2004/0201857 A1 | 10/2004 | Foxlin |
| 2005/0107870 A1 | 5/2005 | Wang et al. |
| 2005/0156601 A1 | 7/2005 | Dupuis et al. |
| 2006/0161871 A1 | 7/2006 | Hotelling et al. |
| 2006/0253804 A1 | 11/2006 | Fukushima et al. |
| 2007/0049374 A1 | 3/2007 | Ikeda et al. |
| 2007/0072674 A1 | 3/2007 | Ohta et al. |
| 2007/0126733 A1 | 6/2007 | Yang et al. |
| 2007/0273644 A1 | 11/2007 | Mondine Natucci |
| 2007/0298883 A1 | 12/2007 | Feldman et al. |
| 2008/0024523 A1 | 1/2008 | Tomite et al. |
| 2008/0133521 A1 | 6/2008 | Podilchuk |
| 2008/0275667 A1 | 11/2008 | Ohta |
| 2008/0309884 A1 | 12/2008 | O'Dor et al. |
| 2009/0005166 A1 | 1/2009 | Sato |
| 2009/0051653 A1 | 2/2009 | Barney et al. |
| 2009/0115406 A1 | 5/2009 | Anderson et al. |
| 2009/0173886 A1 | 7/2009 | Chowdhury |
| 2009/0184825 A1 | 7/2009 | Anderson |
| 2010/0066676 A1 | 3/2010 | Kramer et al. |
| 2010/0085423 A1 | 4/2010 | Lange |
| 2010/0103205 A1 | 4/2010 | Lisaka et al. |
| 2010/0141261 A1 | 7/2010 | Overby et al. |
| 2010/0277476 A1 | 11/2010 | Johansson et al. |
| 2010/0302152 A1 | 12/2010 | Gay |
| 2010/0309292 A1 | 12/2010 | Ho et al. |
| 2011/0018874 A1 | 1/2011 | Hasselgreen et al. |
| 2011/0025603 A1 | 2/2011 | Underkoffler et al. |
| 2011/0184950 A1 | 7/2011 | Skaff et al. |
| 2011/0199088 A1 | 8/2011 | Bittar et al. |
| 2011/0238399 A1 | 9/2011 | Ophir et al. |
| 2011/0248987 A1 | 10/2011 | Mitchell |
| 2011/0263329 A1 | 10/2011 | Miyazaki et al. |
| 2011/0298748 A1 | 12/2011 | Chen et al. |
| 2012/0038549 A1 | 2/2012 | Mandella et al. |
| 2012/0099800 A1 | 4/2012 | Llano et al. |
| 2012/0117076 A1 | 5/2012 | Austermann et al. |
| 2012/0194516 A1 | 8/2012 | Newcombe et al. |
| 2012/0206452 A1 | 8/2012 | Geisner et al. |
| 2012/0236030 A1 | 9/2012 | Border et al. |
| 2012/0328196 A1 | 12/2012 | Kasahara et al. |
| 2013/0002614 A1 | 1/2013 | Nowatzyk et al. |
| 2013/0083011 A1 | 4/2013 | Geisner et al. |
| 2013/0084984 A1 | 4/2013 | Gagner et al. |
| 2013/0117377 A1 | 5/2013 | Miller |
| 2013/0128230 A1 | 5/2013 | Macnamara |
| 2013/0169626 A1 | 7/2013 | Balan et al. |
| 2013/0225199 A1 | 8/2013 | Shaw |
| 2013/0230211 A1 | 9/2013 | Tanabiki et al. |
| 2013/0241773 A1 | 9/2013 | Laine |
| 2013/0278635 A1 | 10/2013 | Maggiore |
| 2013/0290222 A1 | 10/2013 | Gordo et al. |
| 2013/0312009 A1 | 11/2013 | Kramer et al. |
| 2013/0321462 A1 | 12/2013 | Salter et al. |
| 2013/0346168 A1 | 12/2013 | Zhou et al. |
| 2014/0006026 A1 | 1/2014 | Lamb et al. |
| 2014/0011589 A1 | 1/2014 | Barney et al. |
| 2014/0037140 A1 | 2/2014 | Benhimane et al. |
| 2014/0062841 A1 | 3/2014 | Ishikawa et al. |
| 2014/0075060 A1 | 3/2014 | Sharp et al. |
| 2014/0080428 A1 | 3/2014 | Rhoads et al. |
| 2014/0119598 A1 | 5/2014 | Ramachandran et al. |
| 2014/0139226 A1 | 5/2014 | Jaaskelainen et al. |
| 2014/0145932 A1 | 5/2014 | Underkoffler et al. |
| 2014/0176591 A1 | 6/2014 | Klein et al. |
| 2014/0181587 A1 | 6/2014 | Sridharan et al. |
| 2014/0195988 A1 | 7/2014 | Kramer et al. |
| 2014/0212027 A1 | 7/2014 | Hallquist et al. |
| 2014/0222409 A1 | 8/2014 | Efrat et al. |
| 2014/0225822 A1 | 8/2014 | Underkoffler et al. |
| 2014/0267420 A1 | 9/2014 | Schowengerdt et al. |
| 2014/0267646 A1 | 9/2014 | Na'Aman et al. |
| 2014/0285375 A1 | 9/2014 | Crain |
| 2014/0298269 A1 | 10/2014 | Underkoffler et al. |
| 2014/0306866 A1 | 10/2014 | Miller et al. |
| 2014/0321702 A1 | 10/2014 | Schmalstieg |
| 2014/0323148 A1 | 10/2014 | Schmalstieg et al. |
| 2014/0325373 A1 | 10/2014 | Kramer et al. |
| 2014/0354548 A1 | 12/2014 | Lee |
| 2015/0002542 A1* | 1/2015 | Chan ................... G02B 27/017 345/633 |
| 2015/0016777 A1* | 1/2015 | Abovitz ............. G02B 27/0093 385/37 |
| 2015/0019651 A1 | 1/2015 | Kazi et al. |

(56) References Cited

U.S. PATENT DOCUMENTS

| | | |
|---|---|---|
| 2015/0029218 A1 | 1/2015 | Williams et al. |
| 2015/0040074 A1 | 2/2015 | Hofmann et al. |
| 2015/0070347 A1 | 3/2015 | Hofmann et al. |
| 2015/0077326 A1 | 3/2015 | Kramer et al. |
| 2015/0092015 A1 | 4/2015 | Stafford |
| 2015/0100380 A1 | 4/2015 | Jones, Jr. et al. |
| 2015/0100593 A1 | 4/2015 | Underkoffler et al. |
| 2015/0161476 A1 | 6/2015 | Kurz et al. |
| 2015/0163345 A1 | 6/2015 | Cornaby et al. |
| 2015/0172568 A1 | 6/2015 | Choe et al. |
| 2015/0177831 A1 | 6/2015 | Chan et al. |
| 2015/0178554 A1 | 6/2015 | Kanaujia et al. |
| 2015/0178939 A1 | 6/2015 | Bradski et al. |
| 2015/0205126 A1* | 7/2015 | Schowengerdt ..... H04N 13/344 345/633 |
| 2015/0205364 A1 | 7/2015 | Underkoffler et al. |
| 2015/0205388 A1 | 7/2015 | Osterhout |
| 2015/0215611 A1* | 7/2015 | Wu ........................ G06T 11/00 345/419 |
| 2015/0221133 A1 | 8/2015 | Groten et al. |
| 2015/0234477 A1* | 8/2015 | Abovitz ............. G06F 3/04883 382/103 |
| 2015/0243080 A1 | 8/2015 | Steinbach et al. |
| 2015/0262372 A1 | 9/2015 | Cardoso et al. |
| 2015/0301592 A1* | 10/2015 | Miller ..................... G06F 3/013 345/156 |
| 2015/0302652 A1 | 10/2015 | Miller et al. |
| 2015/0309264 A1* | 10/2015 | Abovitz ................... G02B 6/32 385/33 |
| 2015/0309563 A1 | 10/2015 | Connor |
| 2015/0310310 A1 | 10/2015 | Hesch |
| 2015/0324198 A1 | 11/2015 | Alsup et al. |
| 2015/0339857 A1 | 11/2015 | O'Connor et al. |
| 2015/0346495 A1 | 12/2015 | Welch et al. |
| 2015/0358539 A1 | 12/2015 | Catt |
| 2015/0371082 A1 | 12/2015 | Csaszar et al. |
| 2015/0373369 A1 | 12/2015 | Jalai et al. |
| 2015/0379772 A1 | 12/2015 | Hoffman |
| 2016/0005233 A1 | 1/2016 | Fraccaroli et al. |
| 2016/0012643 A1 | 1/2016 | Kezele et al. |
| 2016/0016752 A1* | 1/2016 | Helseth .................. B65H 35/10 242/419.4 |
| 2016/0018896 A1 | 1/2016 | Kramer et al. |
| 2016/0021511 A1 | 1/2016 | Jin et al. |
| 2016/0026253 A1* | 1/2016 | Bradski ................ H04N 13/128 345/8 |
| 2016/0033768 A1 | 2/2016 | Pedrotti et al. |
| 2016/0041048 A1 | 2/2016 | Blum et al. |
| 2016/0098095 A1 | 4/2016 | Gonzalez-Banos et al. |
| 2016/0104311 A1 | 4/2016 | Allyn |
| 2016/0117822 A1 | 4/2016 | Yii et al. |
| 2016/0147065 A1 | 5/2016 | Border et al. |
| 2016/0147070 A1 | 5/2016 | Border et al. |
| 2016/0171644 A1 | 6/2016 | Gruber |
| 2016/0180151 A1 | 6/2016 | Philbin et al. |
| 2016/0180592 A1 | 6/2016 | Bean et al. |
| 2016/0189680 A1 | 6/2016 | Paquette |
| 2016/0203624 A1 | 7/2016 | Anderson |
| 2016/0210783 A1* | 7/2016 | Tomlin ................... G02B 27/00 |
| 2016/0259032 A1 | 9/2016 | Hehn |
| 2016/0259404 A1 | 9/2016 | Woods |
| 2016/0262608 A1 | 9/2016 | Krueger |
| 2016/0282619 A1 | 9/2016 | Oto |
| 2016/0294958 A1 | 10/2016 | Zhang et al. |
| 2016/0299567 A1 | 10/2016 | Crisler et al. |
| 2016/0327789 A1* | 11/2016 | Klug .................. G02B 27/0172 |
| 2016/0378863 A1 | 12/2016 | Shlens et al. |
| 2016/0379092 A1 | 12/2016 | Kutliroff |
| 2017/0011555 A1 | 1/2017 | Li et al. |
| 2017/0032220 A1 | 2/2017 | Medasani et al. |
| 2017/0076328 A1 | 3/2017 | Suzuki |
| 2017/0098406 A1 | 4/2017 | Kobayashi |
| 2017/0109916 A1* | 4/2017 | Kurz ........................ G06F 3/16 |
| 2017/0126988 A1 | 5/2017 | Holzer et al. |
| 2017/0148206 A1 | 5/2017 | Donner et al. |
| 2017/0160798 A1 | 6/2017 | Lanman et al. |
| 2017/0161853 A1 | 6/2017 | Gossweiler et al. |
| 2017/0161919 A1 | 6/2017 | Schroeder |
| 2017/0177082 A1 | 6/2017 | Michail et al. |
| 2017/0184387 A1 | 6/2017 | Lefevre et al. |
| 2017/0205903 A1 | 7/2017 | Miller et al. |
| 2017/0213473 A1 | 7/2017 | Ribeira et al. |
| 2017/0243324 A1 | 8/2017 | Mierle et al. |
| 2017/0244811 A1 | 8/2017 | Mckenzie et al. |
| 2017/0345220 A1 | 11/2017 | Bates |
| 2017/0345398 A1 | 11/2017 | Fuchs et al. |
| 2017/0359570 A1 | 12/2017 | Holzer et al. |
| 2018/0039083 A1 | 2/2018 | Miller et al. |
| 2018/0047332 A1 | 2/2018 | Kuwahara |
| 2018/0053284 A1 | 2/2018 | Rodriguez et al. |
| 2018/0054712 A1 | 2/2018 | Ahuja et al. |
| 2018/0107346 A1 | 4/2018 | Wilson |
| 2018/0203235 A1 | 7/2018 | Fix et al. |
| 2018/0213359 A1 | 7/2018 | Reinhardt et al. |
| 2018/0267309 A1* | 9/2018 | Klug .................. G02B 27/4205 |
| 2018/0268518 A1 | 9/2018 | Nourai et al. |
| 2018/0268519 A1 | 9/2018 | Liebenow et al. |
| 2018/0268610 A1 | 9/2018 | Nourai et al. |
| 2018/0301076 A1 | 10/2018 | Trythall |
| 2018/0315362 A1 | 11/2018 | Newton |
| 2018/0365882 A1 | 12/2018 | Croxsford et al. |
| 2019/0015167 A1 | 1/2019 | Draelos et al. |
| 2019/0056693 A1 | 2/2019 | Gelman et al. |
| 2019/0064526 A1 | 2/2019 | Connor |
| 2019/0066353 A1 | 2/2019 | Anderson et al. |
| 2019/0066365 A1 | 2/2019 | Schmalsteig et al. |
| 2019/0155374 A1 | 5/2019 | Miller et al. |
| 2019/0156504 A1 | 5/2019 | Jiang et al. |
| 2019/0333263 A1 | 10/2019 | Melkote Krishnaprasad et al. |
| 2019/0355176 A1 | 11/2019 | Evans |
| 2020/0005517 A1 | 1/2020 | Anderson et al. |
| 2020/0027194 A1 | 1/2020 | Nourai et al. |
| 2020/0184712 A1 | 6/2020 | Schmalstieg et al. |
| 2020/0209978 A1 | 7/2020 | Pahud et al. |

FOREIGN PATENT DOCUMENTS

| | | |
|---|---|---|
| AU | 2018234921 | 10/2021 |
| CA | 2142338 | 3/1994 |
| CA | 2358682 | 3/1994 |
| CN | 101093586 | 12/2007 |
| CN | 101530325 | 9/2009 |
| CN | 103792661 | 5/2014 |
| CN | 104011788 | 8/2014 |
| CN | 104866829 | 8/2015 |
| EP | 2887311 | 6/2015 |
| JP | 2001-208529 | 8/2001 |
| JP | 2007-128009 | 5/2007 |
| JP | 2012-43308 | 3/2012 |
| JP | 2012-96027 | 5/2012 |
| JP | 2015-52832 | 3/2015 |
| JP | 2016-528476 | 9/2016 |
| KR | 10-2014-0034252 | 3/2014 |
| KR | 10-2016-0013939 | 2/2016 |
| KR | 10-2016-0023888 | 2/2016 |
| WO | WO 94/04938 | 3/1994 |
| WO | WO 2009/091563 | 7/2009 |
| WO | WO 2014/160342 | 10/2014 |
| WO | WO 2015134958 | 9/2015 |
| WO | WO 2016/038240 | 3/2016 |
| WO | WO 2016141373 | 9/2016 |
| WO | WO 2017096396 | 6/2017 |
| WO | WO 2017136833 | 8/2017 |
| WO | WO 9720244 | 12/2019 |
| WO | WO 2020/023383 | 1/2020 |

OTHER PUBLICATIONS

Response to Non-Final office action filed Sep. 12, 16 for U.S. Appl. No. 14/641,376.

Final Office Action for U.S. Appl. No. 14/641,376 dated Nov. 14, 2016.

(56) References Cited

OTHER PUBLICATIONS

Response to Final Office action filed Mar. 14, 17 for U.S. Appl. No. 14/641,376.
PCT International Search Report and Written Opinion for International Appln. No. PCT/US15/19339, Applicant Magic Leap, Inc., Forms PCT/ISA/210, 220, and 237, dated Jun. 24, 2015 (10 pages).
PCT International Search Report and Written Opinion for International Appln. No. PCT/US16/21095, Applicant Magic Leap, Inc., forms PCT/ISA/210, 220, and 237, dated May 31, 2016 (12 pages).
PCT International Search Report and Written Opinion for International Appln. No. PCT/US16/65001, Applicant Magic Leap, Inc., forms PCT/ISA/210, 220, and 237, dated Feb. 16, 2017 (16 pages).
PCT International Search Report and Written Opinion for International Appln. No. PCT/US2017/016722, Applicant Magic Leap, Inc., forms PCT/ISA/210, 220, and 237, dated Apr. 14, 2017 (24 pages).
Notice of Allowance dated Aug. 14, 2017 for U.S. Appl. No. 14/641,376.
Preliminary Amendment filed Aug. 24, 2017 for U.S. Appl. No. 15/425,837.
Non-Final Office Action dated Dec. 6, 2017 for U.S. Appl. No. 15/062,104.
Voluntary Amendment for Canadian Appln. No. 2979560 filed Oct. 6, 2017, 24 pages.
Voluntary Amendment for Japanese Appln. No. 2017-546703 filed Nov. 7, 2017, 7 pages.
Response to Non-Final office action filed Mar. 6, 2018 for U.S. Appl. No. 15/062,104.
Final Office Action filed Apr. 30, 2018 for U.S. Appl. No. 15/062,104.
Coiliot, C., Moutoussamy, J., Boda, M., and Leroy, P.: New ferromagnetic core shapes for induction sensors, J. Sens. Sens. Syst., 3,1-8, https://doi.org/10.5194/jsss-3-1-2014, 2014.
Non-Final Office Action dated Apr. 5, 2018 for U.S. Appl. No. 15/425,837.
Response to Non-Final Office Action filed Jul. 5, 2018 for U.S. Appl. No. 15/425,837.
Pre appeal brief filed Aug. 30, 2018 for U.S. Appl. No. 15/062,104.
Notice of Allowance dated Sep. 6, 2018 for U.S. Appl. No. 15/425,837.
Extended European Search Report dated Oct. 16, 2018 for EP Application No. 16759643.6.
Amendment After Allowance dated Nov. 15, 2018 for U.S. Appl. No. 15/425,837.
Non final Office Action dated Nov. 29, 2018 for U.S. Appl. No. 15/369,646.
Extended European Search Report dated Jan. 7, 2019 for EP Application No. 16871733.8.
Song Yafei et al.: Fast Estimation of Relative Poses for 6-DOF Image Localization, 2015 IEEE International Conference on Multimedia Big Data, IEEE; Apr. 20, 2015, pp. 156-163, XP033173496.
Ng Joe Yue-Hei et al.: Exploiting local features from deep networks for image retrieval, 2015 IEEE Conference on Computer Vision and Pattern recognition workshops (CVPRW), IEEE; Jun. 7, 2015, pp. 53-61, XP032795533.
Bay Herbert et al.: SURF: Speeded up Robust Features, International Conference on Simulation, Modeling and Programming for Autonomous Robots, Simpar 2010, Lecture Notes in Computer Science; Leet Notes Computer; May 7, 2006, pp. 404-417, XP047429677.
Alex Kendall et al.: PoseNet: A Convolutional Metwork for Real-Time 6-DOF Camera Relocalization,https://arxiv.org/pdf/1505.07427v3.pdf, Nov. 23, 2015; XP055536871.
Extended European Search Report dated Jan. 17, 2019 for EP Application No. 17748352.6.
Nair Rahul et al.: "A Survey on Time-of-Flight Stero Fusion", Oct. 9, 2015, Medical Image Computing and Computer Assisted Intervention—MICCAI 2015, 18th International Conference, Munich, Germany, Oct. 5-9, 2015; Proceedings; Lecture Notes in Computer Science; Leet Notes Computer; Springer International Publishing, CH, XP047148654.

Zhu J J et al.: Joint depth and alpha matte optimization via fusion of stero and time-of-flight sensor, 2009 IEEE Conference on Computer Vision and Pattern recognition (CVPR), IEEE; Jun. 20, 2009, pp. 453-460, XP002700137.
Amendment After Non-Final Office Action dated Feb. 28, 2019 for U.S. Appl. No. 15/369,646.
PCT International Search Report and Written Opinion for International Appln. No. PCT/US18/22884, Applicant Magic Leap, Inc., forms PCT/ISA/210, 220, and 237, dated May 21, 2018 (13 pages).
Non-Final Office Action for U.S. Appl. No. 15/923,560 dated Jan. 2, 2019.
Amendment Response to Non-Final Office Action for U.S. Appl. No. 15/923,560 dated Apr. 1, 2019.
PCT International Search Report and Written Opinion for International Appln. No. PCT/US18/22993, Applicant Magic Leap, Inc., forms PCT/ISA/210, 220, and 237, dated Jun. 8, 2018 (13 pages).
PCT Invitation to Pay Additional Fees for International Appln. No. PCT/US18/23011, Applicant Magic Leap, Inc. dated May 25, 2018 (18 pages).
PCT International Search Report and Written Opinion for International Appln. No. PCT/US18/23011, Applicant Magic Leap, Inc. dated Jul. 23, 2018 (18 pages).
Non-Final Office Action for U.S. Appl. No. 15/924,078 dated Mar. 21, 2019.
Reply brief filed May 6, 2019 for U.S. Appl. No. 15/062,104.
Response to Extended European Search Report dated May 13, 2019 for EP Application No. 16759643.6.
Non Final Office action dated Jun. 17, 2019 for U.S. Appl. No. 15/924,011.
Tian et al., View Synthesis Techniques for 3D Video, Proc. SPIE 7443, Applications of Digital Image Processing XXXII, 74430T, Sep. 2009 (Year: 2009).
Final Office Action dated Jun. 21, 2019 for U.S. Appl. No. 15/369,646.
Response to Non-Final Office Action filed Jun. 21, 2019 for U.S. Appl. No. 15/924,078.
Response to Restriction Requirement filed Jul. 22, 2019 for U.S. Appl. No. 15/877,359.
Final Office Action for U.S. Appl. No. 15/923,560 dated Jul. 11, 2019.
Non-Final Office Action for U.S. Appl. No. 15/665,335 dated Apr. 22, 2019.
Response to Non-Final Office Action for U.S. Appl. No. 15/665,335 dated Jul. 22, 2019.
Response to Restriction Requirement filed Mar. 18, 2019 for U.S. Appl. No. 15/665,335.
PCT International Search Report and Written Opinion for International Patent Appln. No. PCT/US2017/044762 dated Oct. 5, 2017 (8 pages).
Response to Extended European Search Report dated Jul. 30, 2019 for European Application No. 16871733.8, (12 pages).
Final Office Action for U.S. Appl. No. 15/924,078 dated Aug. 9, 2019.
Response to Final Office Action and AFCP for U.S. Appl. No. 15/369,646, filed Aug. 21, 2019.
Response Non Final Office action filed Sep. 12, 2019 for U.S. Appl. No. 15/924,011.
Advisory Action dated Sep. 6, 2019 for U.S. Appl. No. 15/369,646.
RCE and Response to Final Office Action for U.S. Appl. No. 15/369,646, filed Sep. 19, 2019.
Office Action for Chinese Appln. No. 201680025479.1 dated Jul. 23, 2019, 16 pages w/English translation.
Response to Final Office Action and AFCP for U.S. Appl. No. 15/924,078, filed Oct. 9, 2019.
Response to Final Office Action for U.S. Appl. No. 15/923,560, filed Oct. 10, 2019.
1st Examination Report dated Oct. 1, 2019 for European Application No. 16759643.6.
Non-Final Office Action dated Oct. 21, 2019 for U.S. Appl. No. 15/877,359.
Final office action dated Oct. 22, 2019 for U.S. Appl. No. 15/924,011.
Advisory Action dated Oct. 22, 2019 for U.S. Appl. No. 15/924,078.
Non-Final Office Action dated Oct. 30, 2019 for U.S. Appl. No. 16/220,617.

(56) References Cited

OTHER PUBLICATIONS

Non-Final Office Action dated Oct. 31, 2019 for U.S. Appl. No. 15/923,560.
RCE and Response to Final Office Action filed Nov. 11, 2019 for U.S. Appl. No. 15/924,078.
Non Final Office Action dated Nov. 8, 2019 for U.S. Appl. No. 15/369,646.
Final office action dated Aug. 9, 2019 for for U.S. Appl. No. 15/924,078.
Office Action for Israeli Appln. No. 254300 dated Oct. 27, 2019, 7 pages w/English translation.
Response to Office Action for Chinese Appln. No. 201680025479.1 filed Nov. 26, 2019, 9 pages w/English translation of claims.
Extended European Search Report dated Nov. 21, 2019 for European Application No. 18767086.4.
Extended European Search Report for European Appln. No. 17837488.0 dated Jul. 11, 2019 (10 pages).
Robert Earl Patterson, et al. "Low-Level Factors in Human Factors of Stereoscopic 3D Displays", ProQuest Ebook Central, Springer, London, Dec. 29, 2014. doi:10.1007/978-1-4471-6651-1_4, chapter 4.2; 4.3.
Jannick Rolland, et al. "The past, present and future of head-mounted display designs"; Nov. 8, 2004, Proc. SPIE 5638, p. 368.
RCE and Response to Final Office Action for U.S. Appl. No. 15/665,335, filed Dec. 4, 2019.
PCT International Search Report and Written Opinion for International Patent Appln. No. PCT/US2019/042819, dated Dec. 4, 2019 (12 pages).
PCT Invitation to Pay Additional Fees for International Patent Appln. No. PCT/US2019/042819, dated Sep. 18, 2019 (2 pages).
Lee, Y., et al., "Estimating Gaze Depth Using Multi-Layer Perceptron," Published by IEEE, retrived electronically on Apr. 12, 2019 (5 pages).
Extended European Search Report for European Appln. No. 18766694.6 dated Nov. 21, 2019 (9 pages).
Theohari S Theohari S et al. "The Magic of the Z-Buffer: A Survey", Journal of WSCG, Plzen, Czech Republic, Feb. 5, 2001, XP55640849.
Amir H. Behzadan et al: "Scalable 1-14 Algorithm for Resolving Incorrect Occlusion in Dynamic Augmented Reality Engineering Environments : Scalable algorithm for resolving incorrect occlusion", Computer-Aided Civil and Infrastructure Engineering, vol. 25, No. I, Jan. 1, 2010, pp. 3-19, XP55640847.
Breen D E et al: "Interactive occlusion 1-14 and automatic object placement for augmented reality", Computer Graphics Forum, Wiley-Blackwell Publishing Ltd, GB, vol. 15, No. 3, Aug. 26, 1996, pp. 11-22, XP002515919.
Mark WR et al: "Post-Rendering 3D 1-14 Warping", Proceedings of 1997 Symposium on Interactive 3 D Graphics Apr. 27-30, 1997 Providence, RI, USA; ACM, New York, NY, USA, Apr. 27, 1997, pp. 7-16, XP000725355.
Amendment After Final Office Action for U.S. Appl. No. 15/924,011 dated Dec. 19, 2019.
Non-Final Office Action for U.S. Appln. No. 16/22,630 dated Dec. 26, 2019.
Non-Final Office Action for U.S. Appl. No. 15/924,078 dated Jan. 13, 2020.
Extended European Search Report for European Appln. No. 18742228.2 dated Jan. 13, 2020 (8 pages).
Amendment After non -final Office Action for U.S. Appl. No. 15/877,359 dated Jan. 21, 2020.
Notice of Allowance for U.S. Appl. No. 15/924,011 dated Jan. 23, 2020.
Response to Extended European Search Report for European Appln. No. 17837488.0 filed Jan. 28, 2020 (23 pages).
Amendment After non -final Office Action for U.S. Appl. No. 16/220,617 dated Jan. 30, 2020.
Amendment After non -final Office Action for U.S. Appl. No. 15/923,560 dated Jan. 31, 2020.
Response to Examination Report filed Feb. 11, 2020 for European Application No. 16759643.6.
Amendment After non -final Office Action for U.S. Appl. No. 15/369,646 dated Feb. 10, 2020.
Notice of Allowance for U.S. Appl. No. 16/220,617 dated Feb. 20, 2020.
Foreign Office Action for Japanese Patent Appln. No. 2017-546703 dated Mar. 10, 2020.
Amendment After non -final Office Action for U.S. Appl. No. 15/924,078 dated Apr. 13, 2020.
Notice of Allowance for U.S. Appl. No. 15/369,646 dated Apr. 8, 2020.
Final Office Action for U.S. Appl. No. 15/877,359 dated Apr. 16, 2020.
Foreign Office Action for Israeli Patent Application No. 259766 dated Mar. 1, 2020.
Amendment After non -final Office Action for U.S. Appl. No. 16/220,630 dated Apr. 27, 2020.
Non-Final Office Action for U.S. Appl. No. 16/848,496 dated May 18, 2020.
Notice of Allowance for U.S. Appl. No. 15/923,560 dated May 19, 2020.
Notice of Allowance for U.S. Appl. No. 15/924,078 dated May 18, 2020.
Foreign Office Action for CN Patent Appln. No. 201680025479.1 dated Apr. 7, 2020.
Jiang, P., etc., "Electro-magnetic Tracking System for Capsule-typed Telemetric Device", Optics and Precision Engineering, vol. 15, No. 8, pp. 1247-1252, Aug. 2007.
1st Examination Report dated Jun. 24, 2020 for New Zealand Patent Application No. 743271.
Foreign Office Action for CN Patent Appln. No. 201680025479.1 dated Jun. 18, 2020.
Notice of Allowance for U.S. Appl. No. 16/220,630 dated Jun. 8, 2020.
Response to Extended European Search Report for European Appln. No. 18767086.4 filed Jun. 15, 2020 (84 pages).
Response to Extended European Search Report for European Appln. No. 18766694.6 filed Jun. 19, 2020 (78 pages).
1st Examiner's Report for AU European Patent Appln. No. 2016225963 dated Jul. 1, 2020.
Foreign Office Action Response for JP Patent Appln. No. 2017-546703 dated Jun. 1, 2020.
Extended European Search Report for EP Patent Appln. No. 18768030.1 dated Jun. 18, 2020.
Mark, W., et al., "Post-Rendering 3D Warping", Proceedings of 1997 Symposium on 3D Graphics, Apr. 27-30, 1997, Providence, RI, USA, pp. 7-ff, XP058285072.
Amendment Response to Non-Final Office Action for U.S. Appl. No. 16/848,496 dated Jul. 22, 2019.
Foreign Exam Report for NZ Patent Appln. No. 735465 dated Jul. 22, 2020.
1st Examination Report for NZ Patent Appln. No. 734200 dated Jun. 15, 2020.
Foreign Submission Reply for EP Patent Appln No. 18766694.6 dated Jun. 19, 2020.
Foreign Examination Report for EP Patent Appln. No. 17837488.0 dated Jul. 22, 2020.
Response to Extended European Search Report for European Appln. No. 18742228.2 dated Aug. 10, 2020 (86 pages).
Notice of Allowance for U.S. Appl. No. 15/923,560 dated Aug. 25, 2020.
Notice of Allowance for U.S. Appl. No. 16/848,496 dated Aug. 24, 2020.
Foreign Office Action for KR Patent Appln. No. 10-2019-7006281 dated Aug. 28, 2020.
Non-Final Office Action for U.S. Appl. No. 16/945,613 dated Sep. 3, 2020.
Notice of Allowance for U.S. Appl. No. 16/220,630 dated Sep. 11, 2020.
Foreign Office Action for JP Patent Application No. 2019-505238 dated Sep. 10, 2020 (no translation available).
Notice of Allowance for U.S. Appl. No. 15/369,646 dated Sep. 22, 2020.

(56) References Cited

OTHER PUBLICATIONS

Notice of Allowance for U.S. Appl. No. 16/220,630 dated Sep. 23, 2020.
Non-Final Office Action for U.S. Appl. No. 16/809,346 dated Oct. 16, 2020.
1st Examination Report for AU Patent Appln. No. 2017214748 dated Oct. 14, 2020.
Non-Final Office Action for U.S. Appl. No. 16/518,431 dated Oct. 27, 2020.
Foreign Exam Report for EP Patent Appln. No. 18767086.4 dated Sep. 23, 2020.
Foreign Exam Report for EP Patent Appln. No. 18766694.6 dated Sep. 23, 2020.
N Stewart et al: "An improved z-buffer CSG rendering algorithm", Proceedings of the Eurographics / SIGGRAPH Workshop on Graphics Hardware. Lisbon, Aug. 31-Sep. 1, 1998; pp. 25-30, XP058111343.
Wolberg G et al: "Separable image warping with spatial lookup tables", Computer Graphics, ACM, US, vol. 23, No. 3, Jul. 1, 1989, pp. 369-378, XP058214788.
R T Stevens: "Primitive", In: "Quick Reference to Computer Graphics Terms a Division of Harcourt Brace & Company", Jan. 1, 1995, XP55730228, p. 166.
J D Foley: "The z-buffer algorithm", In: "Computer Graphics—Principles and Practice", Addison-Wesley, Jan. 1, 1990 (Jan. 1, 1990), XP55731635, pp. 668-672.
Notice of Allowance for U.S. Appl. No. 16/848,496 dated Nov. 2, 2020.
Foreign OA Response for KR Patent Appln. No. 10-2019-7006281 dated Oct. 28, 2020.
Notice of Allowance for U.S. Appl. No. 16/938,578 dated Nov. 19, 2020.
Foreign Exam Report for EP Patent Appln. No. 18742228.2 dated Oct. 1, 2020.
Foreign OA Response for EP Patent Appln. No. 17837488.0 dated Nov. 20, 2020.
Foreign OA Response for IL Patent Application No. 259766 dated Nov. 25, 2020.
1st Exam Report for AU Patent Application No. 2016365422 dated Nov. 4, 2020.
Foreign OA Response for JP Patent Application No. 2019-505238 dated Dec. 1, 2020.
Response to Non-Final Office Action for U.S. Appl. No. 16/945,613 filed Dec. 3, 2020.
Foreign Final OA for JP Patent Appln. No. 2017-546703 dated Nov. 20, 2020.
Foreign OA for KR Patent Appln. No. 10-2019-7006281 dated Dec. 15, 2020.
Foreign Exam Report for AU Patent Appln. No. 2017305227 dated Dec. 16, 2020.
Foreign NOA for IL Patent Application No. 259766 dated Nov. 29, 2020.
Amendment Response to NFOA for U.S. Appl. No. 16/809,346 dated Jan. 11, 2020.
Foreign OA For JP Patent Appln. No. 2019-505238 dated Jan. 12, 2021.
Response to Non-Final Office Action for U.S. Appl. No. 16/518,431, filed Jan. 27, 2021.
Foreign Response for JP Patent Appln. No. 2019-510409 dated Jan. 28, 2021.
Foreign Response for NZ Patent Appln. No. 735465 dated Jan. 21, 2021.
Foreign NOA for KR Patent Appln. No. 10-2019-7022837 dated Jan. 27, 2021.
Foreign Final OA for KR Patent Appln. No. 10-2019-7006281 dated Jan. 27, 2021.
Foreign Response for EP Patent Appln. No. 18742228.2 dated Feb. 11, 2021.
Foreign Response for EP Patent Appln. No. 18768030.1 dated Jan. 18, 2021.
Foreign OA for JP Patent Appln. No. 2019-539183 dated Feb. 19, 2021.
Foreign Exam Report for EP Patent Appln. No. 16871733.8 dated Jan. 11, 2021.
Final Office Action for U.S. Appl. No. 16/518,431 dated Mar. 2, 2021.
Foreign OA for JP Patent Appln. No. 2018-528977 dated Feb. 16, 2021.
Sumit Chopra et al., "Learning a Similarity Metric Discriminatively, with Application to Face Verification", 2005 IEEE Computer Society Conference on Computer Vision and Pattern Recognition (CVPR'05), US, IEEE, Jun. 20, 2005, vol. 1, pp. 539-546 (a document showing a well-known technique).
Florian Schroff et al., "FaceNet: A Unified Embedding for Face Recognition and Clustering", 2015 IEEE Conference on Computer Vision and Pattern Recognition (CVPR), US, IEEE, Jun. 7, 2015, pp. 815-823 (a document showing a well-known technique).
Foreign Exam Report for IN Patent Appln. No. 201747032796 dated Mar. 10, 2021.
Final Office Action for U.S. Appl. No. 16/945,613 dated Mar. 18, 2021.
Notice of Allowance for U.S. Appl. No. 16/809,346 dated Mar. 22, 2021.
Foreign OA for CN Patent Appln. No. 201780010073.0 dated Jan. 21, 2021.
Foreign Exam Report for AU Patent Appln. No. 2018233733 dated Mar. 11, 2021.
Foreign Exam Report for AU Patent Appln. No. 2018236457 dated Mar. 10, 2021.
Foreign Response for AU Patent Appln. No. 2018236457 dated Mar. 26, 2021.
Foreign Exam Report for AU Patent Appln. No. 2018234921 dated Mar. 11, 2021.
Foreign Response for AU Patent Appln. No. 2017214748 dated Mar. 29, 2021.
Foreign Exam Report for AU Patent Appln. No. 2018210015 dated Feb. 23, 2021.
Foreign Response for AU Patent Appln. No. 2018210015 dated Mar. 12, 2021.
Foreign Exam Report for NZ Patent Appln. No. 735465 dated Feb. 15, 2021.
Foreign Response for NZ Patent Appln. No. 735465 dated Mar. 31, 2021.
Foreign Response for AU Patent Appln. No. 2016225963 dated Mar. 31, 2021.
Foreign Response for EP Patent Appln. No. 18767086.4 dated Apr. 6, 2021.
Foreign Response for EP Patent Appln. No. 18766694.6 dated Apr. 6, 2021.
Foreign Notice of Acceptance for AU Patent Appln. No. 2018210015 dated Mar. 24, 2021.
Foreign NOA for IL Patent Appln. No. 267946 dated Apr. 7, 2021.
Foreign Response for JP Patent Appln. No. 2019-505238 dated Apr. 16, 2021.
Foreign OA for KR Patent Appln. No. 10-2017-7028140 dated Apr. 21, 2021.
Foreign Response for JP Patent Appln. No. 2018-540434 dated May 17, 2021.
Foreign Response for EP Patent Appln. No. 16871733.8 dated May 17, 2021.
Foreign Response for JP Patent Appln. No. 2019-539183 dated May 17, 2021.
Foreign Exam Report for EP Patent Appln. No. 16759643.6 dated Apr. 29, 2021.
Foreign Response for AU Patent Appln. No. 2016365422 dated May 14, 2021.
Foreign Response for JP Patent Appln. No. 2018-528977 dated May 13, 2021.
Foreign Response for CN Patent Appln. No. 201780010073.0 dated Jun. 4, 2021.
Notice of Allowance for U.S. Appl. No. 16/945,613 dated Jun. 9, 2021.

(56) References Cited

OTHER PUBLICATIONS

Foreign OA for CN Patent Appln. No. 201880018442.5 dated Apr. 1, 2021.
Non-Final Office Action for U.S. Appl. No. 17/022,317 dated Jun. 10, 2021.
Foreign Exam Report for IN Patent Appln. No. 201847023727 dated Jun. 15, 2021.
Foreign Amendment for KR Patent Appln. No. 10-2017-7028140 dated Jun. 15, 2021.
Foreign OA for IL Patent Appln. No. 260614 dated Mar. 22, 2021.
Foreign NOA for JP Patent Appln. No. 2019-539183 dated Jun. 21, 2021.
2nd Exam Report for EP Patent Appln. No. 17837488.0 dated May 28, 2021.
Non-Final Office Action for U.S. Appl. No. 16/518,431 dated Jun. 23, 2021.
Response to Final Office Action for U.S. Appl. No. 16/945,613, filed May 17, 2021.
RCE Response to Final Office Action for U.S. Appl. No. 16/518,431 dated Jun. 1, 2021.
Foreign Response for IL Patent Appln. No. 254300 dated Mar. 14, 2021.
Foreign OA for JP Patent Appln. No. 2018-540434 dated Dec. 17, 2020.
Foreign FOA for JP Patent Appln. No. 2018-528977 dated Jun. 7, 2021.
Foreign FOA for JP Patent Appln. No. 2018-540434 dated Jun. 14, 2021.
Foreign Exam Report for CA Patent Appln. No. 2979560 dated Jun. 15, 2021.
Foreign Exam Report for EP Patent Appln. No. 2016365422 dated Jun. 11, 2021.
Foreign Response for IL Patent Appln. No. 260614 dated Jul. 21, 2021.
Non-Final Office Action for U.S. Appl. No. 16/922,145 dated Jul. 22, 2021.
Notice of Allowance for U.S. Appl. No. 16/945,613 dated Aug. 3, 2021.
English Translation of Foreign OA for JP Patent Appln. No. 2019-550189 dated Jul. 8, 2021.
Foreign OA for JP Patent Appln. No. 2019-550231 dated Jul. 26, 2021.
Foreign OA for JP Patent Appln. No. 2019-550200 dated Jul. 26, 2021.
Foreign NOA for NZ Patent Appln. No. 735465 dated Jul. 22, 2021.
Foreign Response for CN Patent Appln. No. 201880018442.5 dated Aug. 12, 2021.
Foreign OA for CN Patent Appln. No. 201780010073.0 dated Jul. 9, 2021.
Foreign NOA for KR Patent Appln. No. 10-2017-7028140 dated Aug. 23, 2021.
Foreign Exam Report for IN Patent Appln. No. 201947005860 dated Aug. 18, 2021.
Decision to Grant for EP Patent Appln. No. 18742228.2 dated Aug. 19, 2021.
Foreign Exam Report for AU Patent Appln. No. 2021204725 dated Aug. 24, 2021.
Foreign Response for EP Patent Appln. No. 16759643.6 dated Sep. 3, 2021.
Foreign Response for IN Patent Appln. No. 201747032796 dated Sep. 8, 2021.
Foreign Response for AU Patent Appln. No. 2018234921 dated Sep. 15, 2021.
Foreign Response for KR Patent Appln. No. 10-2019-7030322 dated Sep. 13, 2021.
Foreign Response for KR Patent Appln. No. 10-2019-7030321 dated Sep. 10, 2021.
Foreign Response for AU Patent Appln. No. 2016365422 dated Sep. 16, 2021.
Foreign Response forCN Patent Appln. No. 201780010073.0 dated Sep. 22, 2021.
Foreign Response for KR Patent Appln. No. 10-2019-7029900 dated Sep. 17, 2021.
Foreign Exam Report for IN Patent Appln. No. 201847025793 dated Sep. 22, 2021.
Foreign Response for AU Patent Appln. No. 2018233733 dated Oct. 1, 2021.
Foreign NOA for JP Patent Appln. No. 2019-505238 dated Oct. 5, 2021.
Foreign Response for EP Patent Appln. No. 17837488.0 dated Oct. 5, 2021.
Notice of Allowance for U.S. Appl. No. 17/022,317 dated Oct. 6, 2021.
Foreign Response for JP Patent Appln. No. 2019-550189 dated Oct. 8, 2021.
Foreign Notice of Acceptance for AU Patent Appln. No. 2018234921 dated Sep. 27, 2021.
3rd Exam Report for AU Patent Appln. No. 2016365422 dated Oct. 11, 2021.
Foreign Exam Report for EP Patent Appln. No. 18767086.4 dated Sep. 1, 2021.
Foreign Response for CA Patent Appln. No. 2979560 dated Oct. 13, 2021.
Amendment Response to NFOA for U.S. Appl. No. 16/922,145 dated Oct. 18, 2021.
Foreign Response for AU Patent Appln. No. 2016365422 dated Oct. 22, 2021.
Foreign Response for JP Patent Appln. No. 2019-550200 dated Oct. 22, 2021.
Extended European Search Report for EP Patent Appln. No. 19840248.9 dated Sep. 29, 2021.
Schmeing Michael et al: "Faithful Disocclusion Filling in Depth Image Based Rendering Using Superpixel-Based Inpainting", IEEE Transactions on Multimedia, IEEE Service Center, US, vol. 17, No. 12, Dec. 1, 2015 (Dec. 1, 2015), pp. 2160-2173, XP011589953, ISSN: 1520-9210, DOI: 10.1109/TMM.2015.2476372 [retrieved on Nov. 13, 2015].
Foreign Exam Report for EP Patent Appln. No. 18766694.6 dated Sep. 24, 2021.
Non-Final Office Action for U.S. Appl. No. 17/091,278 dated Nov. 18, 2021.
Notice of Allowance for U.S. Appl. No. 16/518,431 dated Nov. 17, 2021.
Foreign NOA for KR Patent Appln. No. 10-2019-7030321 dated Nov. 4, 2021.
Notice of Allowance for U.S. Appl. No. 16/922,145 dated Nov. 19, 2021.
Notice of Allowance for U.S. Appl. No. 16/937,510 dated Dec. 1, 2021.
Foreign NOA for KR Patent Appln. No. 10-2019-7029900 dated Nov. 18, 2021.
Foreign NOA for KR Patent Appln. No. 10-2019-7030322 dated Nov. 18, 2021.
Foreign OA for CN Patent Appln. No. 201780010073.0 dated Oct. 29, 2021.
Foreign Response for EP Patent Appln. No. 18742228.2 dated Dec. 7, 2021.
Foreign OA for CN Patent Appln. No. 201680080997.3 dated Sep. 29, 2021.
2nd Exam Report for CA Patent Appln. No. 2979560 dated Nov. 25, 2021.
Non-Final Office Action for U.S. Appl. No. 17/178,524 dated Dec. 15, 2021.
Foreign NOA for AU Patent Appln. No. 2017305227 dated Dec. 1, 2021.
Non-Final Office Action for U.S. Appl. No. 17/137,107 dated Dec. 21, 2021.
Notice of Allowance for U.S. Appl. No. 17/022,317 dated Dec. 22, 2021.
Foreign Response for CN Patent Appln. No. 201780010073.0 dated Dec. 31, 2021.

(56) References Cited

OTHER PUBLICATIONS

Foreign Exam Report for IN Patent Appln. No. 201947030779 dated Jan. 4, 2022.
Foreign Response for EP Patent Appln. No. 18767086.4 dated Jan. 11, 2022.
Foreign NOA for CN Patent Appln. No. 201880018442.5 dated Jan. 12, 2022.
Foreign Exam Report for IN Patent Appln. No. 201947040457 dated Feb. 3, 2022.
Foreign Exam Report for IN Patent Appln. No. 201947040458 dated Feb. 4, 2022.
Foreign Exam Report for IN Patent Appln. No. 201947040852 dated Feb. 1, 2022.
Foreign OA for KR Patent Appln. No. 10-2021-7006131 dated Feb. 9, 2022 (with English translation).
Amendment Response to NFOA for U.S. Appl. No. 17/091,278 dated Feb. 18, 2022.
Foreign OA for JP Patent Appln. No. 2017-546703 dated Feb. 3, 2022 (with English translation).
Notice of Allowance for U.S. Appl. No. 16/518,431 dated Feb. 24, 2022.
Foreign OA for JP Patent Appln. No. 2022-002800 dated Feb. 8, 2022 (with English translation).
Foreign Response for JP Patent Appln. No. 2019-550231 dated Mar. 8, 2022.
Foreign OA for JP Patent Appln. No. 2022-2802 dated Feb. 8, 2022 (with English translation).
Foreign NOA for JP Patent Appln. No. 2019-550231 dated Mar. 11, 2022.
Amendment Response to NFOA for U.S. Appl. No. 17/178,524 dated Mar. 15, 2022.
Amendment Response to NFOA for U.S. Appl. No. 17/137,107 dated Mar. 21, 2022.
Foreign Response for CA Patent Appln. No. 2979560 dated Mar. 24, 2022.
Notice of Allowance for U.S. Appl. No. 17/091,278 dated Mar. 28, 2022.
Foreign Summons for Oral Proceedings for EP Patent Appln. No. 16871733.8 dated Mar. 15, 2022.
Foreign Response for IN Patent Appln. No. 201847025793 dated Mar. 21, 2022.
Foreign Response for EP Patent Appln. No. 18766694.6 dated Apr. 4, 2022.
Notice of Allowance for U.S. Appl. No. 17/178,524 dated Apr. 6, 2022.
Foreign Exam Report for AU Patent Appln. No. 2022201750 dated Apr. 6, 2022.
Foreign Exam Report for AU Patent Appln. No. 2021290369 dated Mar. 29, 2022.
Foreign NOA for IL Patent Appln. No. 264489 dated Mar. 21, 2022 in English.
Notice of Allowance for U.S. Appl. No. 17/137,107 dated Apr. 20, 2022.
Foreign Response for EP Patent Appln. No. 19840248.9 dated Apr. 29, 2022.
Foreign NOA for IL Patent Appln. No. 260614 dated Mar. 16, 2022.
Foreign Response for JP Patent Appln. No. 2022-2802 dated May 9, 2022.
Foreign Response for JP Patent Appln. No. 2022-2800 dated May 9, 2022.
Extended European Search Report for EP Patent Appln. No. 21196532.2 dated Mar. 28, 2022.
Foreign NOA for JP Patent Appln. No. 2022-2800 dated May 24, 2022.
Foreign NOA for JP Patent Appln. No. 2022-2802 dated May 24, 2022.
Foreign Exam Report for AU Patent Appln. No. 2022200841 dated May 19, 2022.
Foreign Response for JP Patent Appln. No. 2021-41375 dated May 30, 2022.
Foreign Examiner's Report for CA Patent Appln. No. 2979560 dated May 31, 2022.
Foreign OA for JP Patent Appln. No. 2021-116964 dated Jun. 6, 2022.
Foreign Response for All Patent Appln. No. 2021204725 dated Jul. 15, 2022.
Foreign NOA for IL Patent Appln. No. 284939 dated May 31, 2022 in English.
Foreign Intent to Grant for EP Patent Appln. No. 16759643.6 dated Jul. 21, 2022.
Foreign OA for JP Patent Appln. No. 2021-41375 dated Jul. 4, 2022 (with English translation).
Foreign NOA for IL Patent Appln. No. 284404 dated Jul. 31, 2022.
Foreign NOA for AU Patent Appln. No. 2021204725 dated Jul. 26, 2022.
Foreign Exam Report for NZ Patent Appln. No. 750261 dated Aug. 5, 2022.
Foreign Response for KR Patent Appln. No. 10-2022-7005613 dated Aug. 29, 2022.
Foreign Notification Prior to Acceptance for IL Patent Appln. No. 290308 dated Sep. 4, 2022.
Foreign Response for AU Patent Appln. No. 2021290369 dated Sep. 29, 2022.
Foreign Response for CA Patent Appln. No. 2979560 dated Sep. 30, 2022.
Foreign Response for IN Patent Appln. No. 201947030779 dated Sep. 30, 2022.
Foreign Response for JP Patent Appln. No. 2021-41375 dated Oct. 3, 2022.
Non-Final Office Action for U.S. Appl. No. 17/514,606 dated Sep. 20, 2022.
Foreign Exam Report for NZ Patent Appln. No. 790720 dated Sep. 27, 2022.
Foreign Notice of Acceptance for AU Patent Appln. No. 2021290369 dated Oct. 10, 2022.
Foreign Response for IN Patent Appln. No. 201947040457 dated Oct. 20, 2022 in English.
Foreign Response for IN Patent Appln. No. 201947040852 dated Oct. 21, 2022 in English.
Foreign Response for EP Patent Appln. No. 21196532.2 dated Oct. 27, 2022.
Foreign Response for IN Patent Appln. No. 201947040460 dated Oct. 25, 2022 in English.
Foreign Response for IN Patent Appln. No. 201947040458 dated Oct. 26, 2022 in English.
Foreign OA for JP Patent Appln. No. 2021-168082 dated Oct. 14, 2022 (with English translation).

\* cited by examiner

ID-DISTANCE VIRTUAL AND
AUGMENTED REALITY SYSTEMS AND
METHODS

CROSS-REFERENCE TO RELATED APPLICATION(S)

The present application is a continuation of U.S. application Ser. No. 16/809,346, filed on Mar. 4, 2020 and entitled "FIXED-DISTANCE VIRTUAL AND AUGMENTED REALITY SYSTEMS AND METHODS", which is a continuation of U.S. application Ser. No. 15/665,335, filed on Jul. 31, 2017 and entitled "FIXED-DISTANCE VIRTUAL AND AUGMENTED REALITY SYSTEMS AND METHODS", which claims priority to U.S. Provisional Application Ser. No. 62/370,117, filed on Aug. 2, 2016 and entitled "FIXED-DISTANCE VIRTUAL AND AUGMENTED REALITY SYSTEMS AND METHODS." This application is related to co-owned U.S. Provisional Application Ser. No. 62/301,502 filed on Feb. 29, 2016 entitled "VIRTUAL AND AUGMENTED REALITY SYSTEMS AND METHODS," and co-owned U.S. patent application Publication Ser. No. 15/146,296 filed on May 4, 2016 entitled "SEPARATED PUPIL OPTICAL SYSTEMS FOR VIRTUAL AND AUGMENTED REALITY AND METHODS FOR DISPLAYING IMAGES USING SAME,". The contents of the patent applications mentioned herein are hereby expressly and fully incorporated by reference in their entirety, as though set forth in full.

BACKGROUND

Modern computing and display technologies have facilitated the development of virtual reality ("VR"), augmented reality ("AR"), and mixed reality ("MR") systems, wherein digitally reproduced images or portions thereof are presented to a user in a manner wherein they seem to be, or may be perceived as, real. A virtual reality, or "VR", scenario typically involves presentation of digital or virtual image information without transparency to other actual real-world visual input; an augmented reality, or "AR", scenario typically involves presentation of digital or virtual image information as an augmentation to visualization of the actual world around the user. A mixed reality, or "MR", system also introduces simulated objects into a real-world environment, but these objects typically feature a greater degree of interactivity than in AR systems. The simulated elements can often times be interactive in real time. Accordingly, AR and MR scenarios involve presentation of digital or virtual image information with at least partial transparency to other actual real-world visual input. The human visual perception system is very complex, and producing a VR/AR/MR technology that facilitates a comfortable, natural-feeling, rich presentation of virtual image elements amongst other virtual or real-world imagery elements is challenging.

The visualization center of the brain gains valuable perception information from the motion of both eyes and components thereof relative to each other. Vergence movements (i.e., rolling movements of the pupils toward or away from each other to converge the lines of sight of the eyes to fixate upon an object at various distances) of the two eyes relative to each other are closely associated with focusing (or "accommodation") of the lenses of the eyes. Under normal conditions, changing the focus of the lenses of the eyes, or accommodating the eyes, to focus upon an object at a different distance will automatically cause a matching change in vergence to the same distance, under a relationship known as the "accommodation-vergence reflex." Likewise, a change in vergence will trigger a matching change in accommodation, under normal conditions. Working against this reflex, as do most conventional stereoscopic VR/AR/MR configurations, is known to produce eye fatigue, headaches, or other forms of discomfort in users.

Stereoscopic wearable glasses generally feature two displays for the left and right eyes that are configured to display images with slightly different element presentation such that a three-dimensional perspective is perceived by the human visual system. Such configurations have been found to be uncomfortable for many users due to a mismatch between vergence and accommodation ("vergence-accommodation conflict") which must be overcome to perceive the images in three dimensions. Indeed, some users are not able to tolerate stereoscopic configurations. These limitations apply to VR/AR/MR systems. Accordingly, most conventional VR/AR/MR systems are not optimally suited for presenting a rich, binocular, three-dimensional experience in a manner that will be comfortable and maximally useful to the user, in part because prior systems fail to address some of the fundamental aspects of the human perception system, including the vergence-accommodation conflict.

Full VR/AR/MR systems must also be capable of displaying virtual digital content at various perceived positions and distances relative to the user. The design of VR/AR/MR systems also presents numerous other challenges, including the speed of the system in delivering virtual digital content, quality of virtual digital content, eye relief of the user (addressing the vergence-accommodation conflict), size and portability of the system, and other system and optical challenges.

One possible approach to address these problems (including the vergence-accommodation conflict) is to project images at multiple depth planes. To implement this type of system, one approach is to use a large number of optical elements (e.g., light sources, prisms, gratings, filters, scan-optics, beam-splitters, mirrors, half-mirrors, shutters, eye pieces, etc.) to project images at a sufficiently large number (e.g., six) of depth planes. The problem with this approach is that using a large number of components in this manner necessarily requires a larger form factor than is desirable, and limits the degree to which the system size can be reduced. The large number of optical elements in these systems also results in a longer optical path, over which the light and the information contained therein can be degraded. These design issues result in cumbersome systems which are also power intensive. The systems and methods described herein are configured to address these challenges by presenting a fixed-distance mixed reality optical system.

SUMMARY

In one embodiment, a fixed-distance display system includes a light source configured to generate a light beam. The system also includes a light guiding optical element configured to propagate at least a portion of the light beam by total internal reflection. The system further includes a first inertial measurement unit configured to measure a first value for calculating a head pose of a user. Moreover, the system includes a camera configured to capture an image for machine vision optical flow analysis. The display system is configured to display virtual images only within a tolerance range of a single predetermined optical plane.

In one or more embodiments, the first inertial measurement unit is disposed adjacent the user's head. The system may also include a second inertial measurement unit configured to measure a second value for calculating the head pose of the user. The second inertial measurement unit may be disposed adjacent the user's head. The system may also include a third inertial measurement unit configured to measure a third value for calculating a body pose of the user. The third inertial measurement unit may be disposed adjacent the user's waist. The first inertial measurement unit, the second inertial measurement unit, the third inertial measurement unit, and the camera may be configured to match a field of view of the fixed-distance display system to the user's body position.

In one or more embodiments, the tolerance range is within 0.2 diopters to 0.6 diopters of the single predetermined optical plane. The display system may be configured to display three dimensional virtual images. The display system may be configured to display the three dimensional virtual images having dimensions that do not exceed 0.2 diopters to 0.6 diopters.

In another embodiment, a display method includes measuring a first value relating to a head pose. The method also includes calculating the head pose of a user based on the first value. The method further includes capturing an image. Moreover, the method includes performing machine vision optical flow analysis based on the image. In addition, the method includes generating a light beam. The method also includes propagating at least a portion of the light beam by total internal reflection. The method further includes displaying virtual images only within a tolerance range of a single predetermined optical plane.

In one or more embodiments, the method also includes measuring a second value relating to the head pose. The method may further include calculating the head pose of the user from the first value and the second value. Moreover, the method may include measuring a third value relating to a body pose. In addition, the method may include calculating the body pose of the user from the third value. The method may also include analyzing the first value, the second value, the third value, and the image to match a field of view of the user to the user's body position.

In one or more embodiments, the tolerance range is within 0.2 diopters to 0.6 diopters of the single predetermined optical plane. The method may also include displaying three dimensional virtual images. The displayed three dimensional virtual images may have dimensions that do not exceed 0.2 diopters to 0.6 diopters.

In still another embodiment, a computer program product embodied in a non-transitory computer readable medium, the computer readable medium having stored thereon a sequence of instructions which, when executed by a processor causes the processor to execute a method for displaying, the method includes generating a light beam. The method also includes propagating at least a portion of the light beam by total internal reflection. The method further includes measuring a first value relating to a head pose. Moreover, the method includes calculating the head pose of a user based on the first value. In addition, the method includes capturing an image. The method also includes performing machine vision optical flow analysis based on the image. The method further includes displaying virtual images only within a tolerance range of a single predetermined optical plane.

In yet another embodiment, a body-centric display method includes measuring a first value relating to a head pose. The method also includes calculating the head pose of a user based on the first value. The method further includes measuring a second value relating to a body pose. Moreover, the method includes calculating the body pose of the user from the second value. In addition, the method includes generating a virtual image configured to be displayed only within a tolerance range of a single predetermined optical plane based on the head pose and the body pose. The method also includes displaying the virtual image only within the tolerance range of the single predetermined optical plane.

BRIEF DESCRIPTION OF THE DRAWINGS

The drawings illustrate the design and utility of various embodiments of the present invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Figure 1:
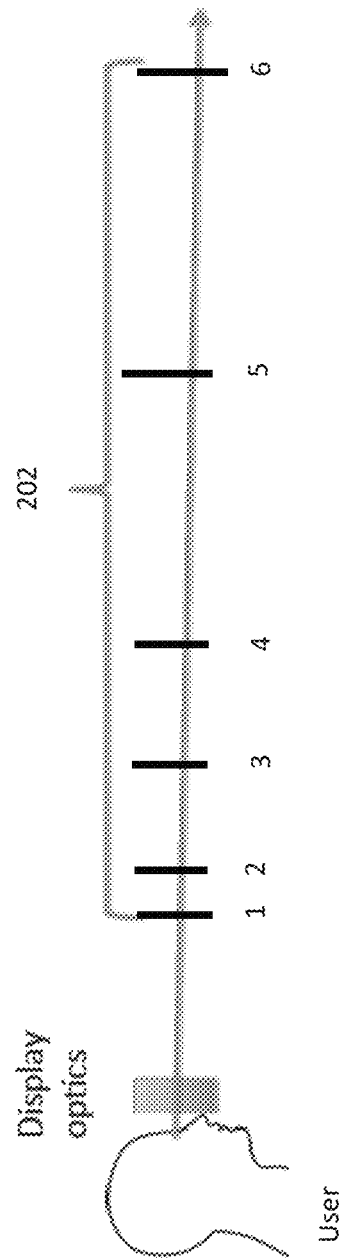
FIG. 1 is a diagram depicting the focal planes of a multiple-plane focus full optical system.

Various embodiments of the invention are directed to systems, methods, and articles of manufacture for implementing fixed-distance mixed reality optical systems in a single embodiment or in multiple embodiments. Other objects, features, and advantages of the invention are described in the detailed description, figures, and claims.

Various embodiments will now be described in detail with reference to the drawings, which are provided as illustrative examples of the invention so as to enable those skilled in the art to practice the invention. Notably, the figures and the examples below are not meant to limit the scope of the present invention. Where certain elements of the present invention may be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Further, various embodiments encompass present and future known equivalents to the components referred to herein by way of illustration.

The optical systems may be implemented independently of AR/MR systems, but many embodiments below are described in relation to AR/MR systems for illustrative purposes only.

Summary of Problem and Solution

One type of optical system for generating virtual images at various depths includes numerous optical components (e.g., light sources, prisms, gratings, filters, scan-optics, beam-splitters, mirrors, half-mirrors, shutters, eye pieces, etc.) that increase in number, thereby increasing the complexity, size and cost of VR/AR/MR systems, as the quality of the 3-D experience/scenario (e.g., the number of imaging planes) and the quality of images (e.g., the number of image colors) increases. The increasing size of optical systems with increasing 3-D scenario/image quality imposes a limit on the minimum size of VR/AR/MR systems resulting in cumbersome systems with reduced optical efficiency.

The following disclosure describes various embodiments of systems and methods for creating 3-D perception around a single predetermined distance using a single-plane focus optical element for each eye that address the problem, by providing optical systems with fewer components and increased efficiency. In particular, the systems described herein utilize a minimal set of optical system components to provide an optical system for displaying virtual objects at a predetermined distance from a user for mixed reality scenarios. This optical system design simplifies and reduces the size of VR/AR/MR systems by limiting the function of such systems to displaying virtual objects at a predetermined distance.

Full Augmented Reality Systems

Before describing the details of embodiments of fixed-distance mixed reality optical systems, this disclosure will now provide a brief description of related full AR/MR systems, which are configured to present a full AR scenario with virtual objects appearing at a plurality of positions along a user's optical axis (e.g., from infinity to adjacent the user). Mixed reality optical systems (full and/or fixed-distance) may be implemented independently of AR/MR systems, but many systems below are described in relation to AR/MR systems for illustrative purposes only. Various augmented reality display systems have been discussed in co-owned U.S. Utility patent application Ser. No. 14/555,585 filed on Nov. 27, 2014 and entitled "VIRTUAL AND AUGMENTED REALITY SYSTEMS AND METHODS," the contents of which are hereby expressly and fully incorporated herein by reference as though set forth in full.

One possible approach to implementing a full AR/MR system uses, for each eye of a user, a plurality of volume phase holograms, surface-relief holograms, or light-guiding optical elements ("LOE") that are embedded with depth plane information to generate images that appear to originate from respective depth planes. In other words, a diffraction pattern, or diffractive optical element ("DOE") may be embedded within or imprinted upon an LOE such that as collimated light (light beams with substantially planar wavefronts) is substantially totally internally reflected along the LOE, it intersects the diffraction pattern at multiple locations and at least partially exits toward the user's eye. The DOEs are configured so that light exiting therethrough from an LOE are verged so that they appear to originate from a particular depth plane. The collimated light may be generated using an optical condensing lens (a "condenser").

For example, a first LOE may be configured to deliver collimated light to the eye that appears to originate from the optical infinity depth plane (0 diopters). Another LOE may be configured to deliver collimated light that appears to originate from a distance of 2 meters (½ diopter). Yet another LOE may be configured to deliver collimated light that appears to originate from a distance of 1 meter (1 diopter). By using a stacked LOE assembly, it can be appreciated that multiple depth planes may be created, with each LOE configured to display images that appear to originate from a particular depth plane. It should be appreciated that the stack may include any number of LOEs. However, at least N stacked LOEs are required to generate N depth planes. Further, N, 2N or 3N stacked LOEs may be used to generate RGB colored images at N depth planes.

In order to present virtual content in a full 3-D AR scenario to a user, the full AR/MR system projects images of the virtual content into the user's eye so that they appear to originate from various depth planes in the Z direction (i.e., orthogonally away from the user's eye). In other words, the virtual content may not only change in the X and Y directions (i.e., in a 8D plane orthogonal to a central visual axis of the user's eye), but it may also appear to change in the Z direction such that the user may perceive an object to be very close or at an infinite distance or any distance in between. In full AR/MR systems, the user may perceive multiple objects simultaneously at different depth planes. For example, the user may see a virtual dragon appear from infinity and run towards the user. Alternatively, the user may simultaneously see a virtual bird at a distance of 3 meters away from the user and a virtual coffee cup at arm's length (about 1 meter) from the user.

Multiple-plane focus full AR/MR systems create a perception of variable depth by projecting images on some or all of a plurality of depth planes located at respective fixed distances in the Z direction from the user's eye. Referring now to FIG. 1, it should be appreciated that multiple-plane focus full AR/MR systems typically display frames at fixed depth planes 202 (e.g., the six depth planes 202 shown in FIG. 1). One exemplary multiple-plane focus full AR/MR system has six fixed depth planes 202 in the Z direction. In generating virtual content at one or more of the six depth planes 202, 3-D perception is created such that the user perceives one or more virtual objects at varying distances from the user's eye. Given that the human eye is more sensitive to objects that are closer in distance than objects that appear to be far away, more depth planes 202 are generated closer to the eye, as shown in FIG. 1. In other systems, the depth planes 202 may be placed at equal distances away from each other.

Depth plane positions 202 are typically measured in diopters, which is a unit of optical power equal to the inverse of the focal length measured in meters. For example, in one system, depth plane 1 may be ⅓ diopters away, depth plane 2 may be 0.3 diopters away, depth plane 3 may be 0.2 diopters away, depth plane 4 may be 0.15 diopters away, depth plane 5 may be 0.1 diopters away, and depth plane 6 may represent infinity (i.e., 0 diopters away). It should be appreciated that other systems may generate depth planes 202 at other distances/diopters. Thus, in generating virtual content at strategically placed depth planes 202, the user is able to perceive virtual objects in three dimensions. For example, the user may perceive a first virtual object as being close to him when displayed in depth plane 1, while another virtual object appears at infinity at depth plane 6. Alternatively, the virtual object may first be displayed at depth plane 6, then depth plane 5, and so on until the virtual object appears very close to the user. It should be appreciated that the above examples are significantly simplified for illustrative purposes. In another system, all six depth planes may be concentrated on a particular focal distance away from the user. For example, if the virtual content to be displayed is a coffee cup half a meter away from the user, all six depth planes could be generated at various cross-sections of the coffee cup, giving the user a highly granulated 3-D view of the coffee cup.

In one system, the full AR/MR system may work as a multiple-plane focus system. In other words, all six LOEs may be illuminated simultaneously, such that images appearing to originate from six fixed depth planes are generated in rapid succession with the light sources rapidly conveying image information to LOE 1, then LOE 2, then LOE 3 and so on. For example, a portion of the desired image, comprising an image of the sky at optical infinity may be injected at time 1 and the LOE 1090 retaining collimation of light (e.g., depth plane 6 from FIG. 1) may be utilized. Then an image of a closer tree branch may be injected at time 2 and an LOE 1090 configured to create an image appearing to originate from a depth plane 10 meters away (e.g., depth plane 5 from FIG. 1) may be utilized; then an image of a pen may be injected at time 3 and an LOE 1090 configured to create an image appearing to originate from a depth plane 1 meter away may be utilized. This type of paradigm can be repeated in rapid time sequential (e.g., at 360 Hz) fashion such that the user's eye and brain (e.g., visual cortex) perceives the input to be all part of the same image.

Full AR/MR systems are required to project images (i.e., by diverging or converging light beams) that appear to originate from various locations along the Z axis (i.e., depth planes) to generate images for a full 3-D experience. As used in this application, "light beams" include, but are not limited to, directional projections of light energy (including visible and invisible light energy) radiating from a light source. Generating images that appear to originate from various depth planes conforms or synchronizes the vergence and accommodation of the user's eye for that image, and minimizes or eliminates vergence-accommodation conflict.

The full AR scenario functional requirement to project images that appear to originate from various depth planes imposes minimum complexity, size and cost limitations on full AR/MR systems. The fixed-distance AR/MR systems described herein avoid these limitations by reducing the function of the system.

Fixed-Distance Augmented Reality Systems

Figure 2:
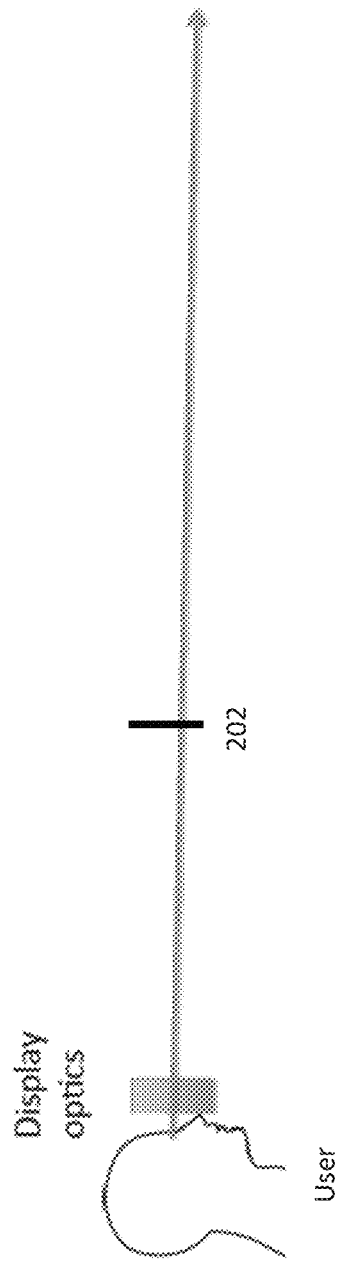
FIG. 2 is a diagram depicting the focal plane of a single-plane focus fixed-distance optical system according to one embodiment.
Figure 3:
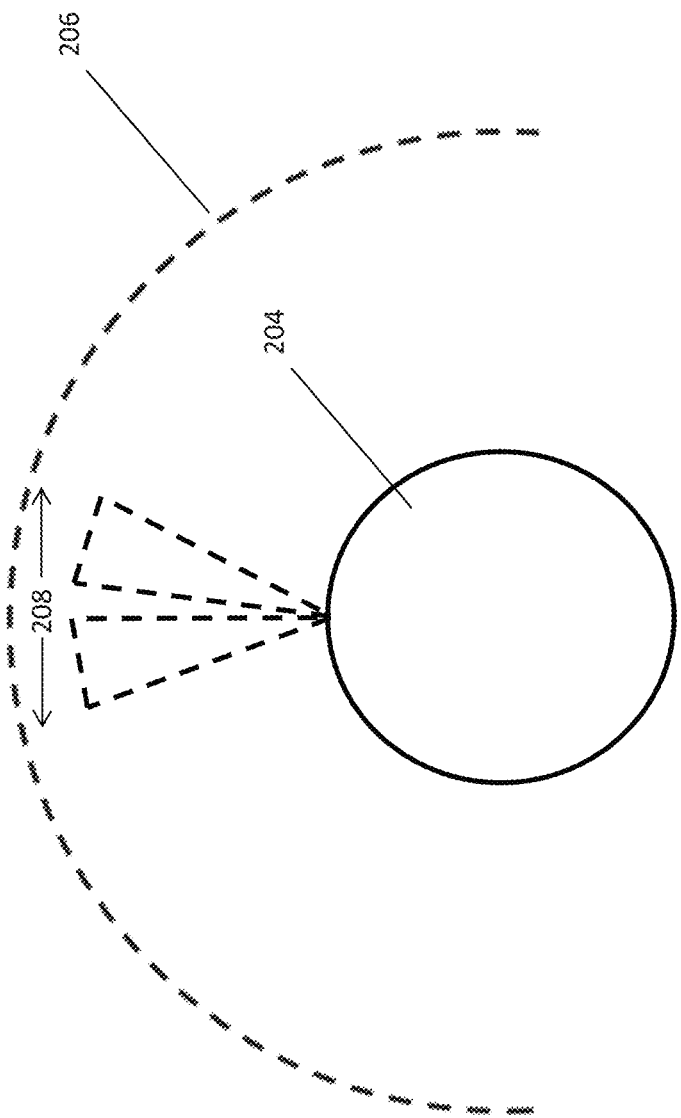
FIGS. 3 and 4 are schematic views of respective fields-of-view of a user of single-plane focus fixed-distance optical systems according to two embodiments.
Figure 4:
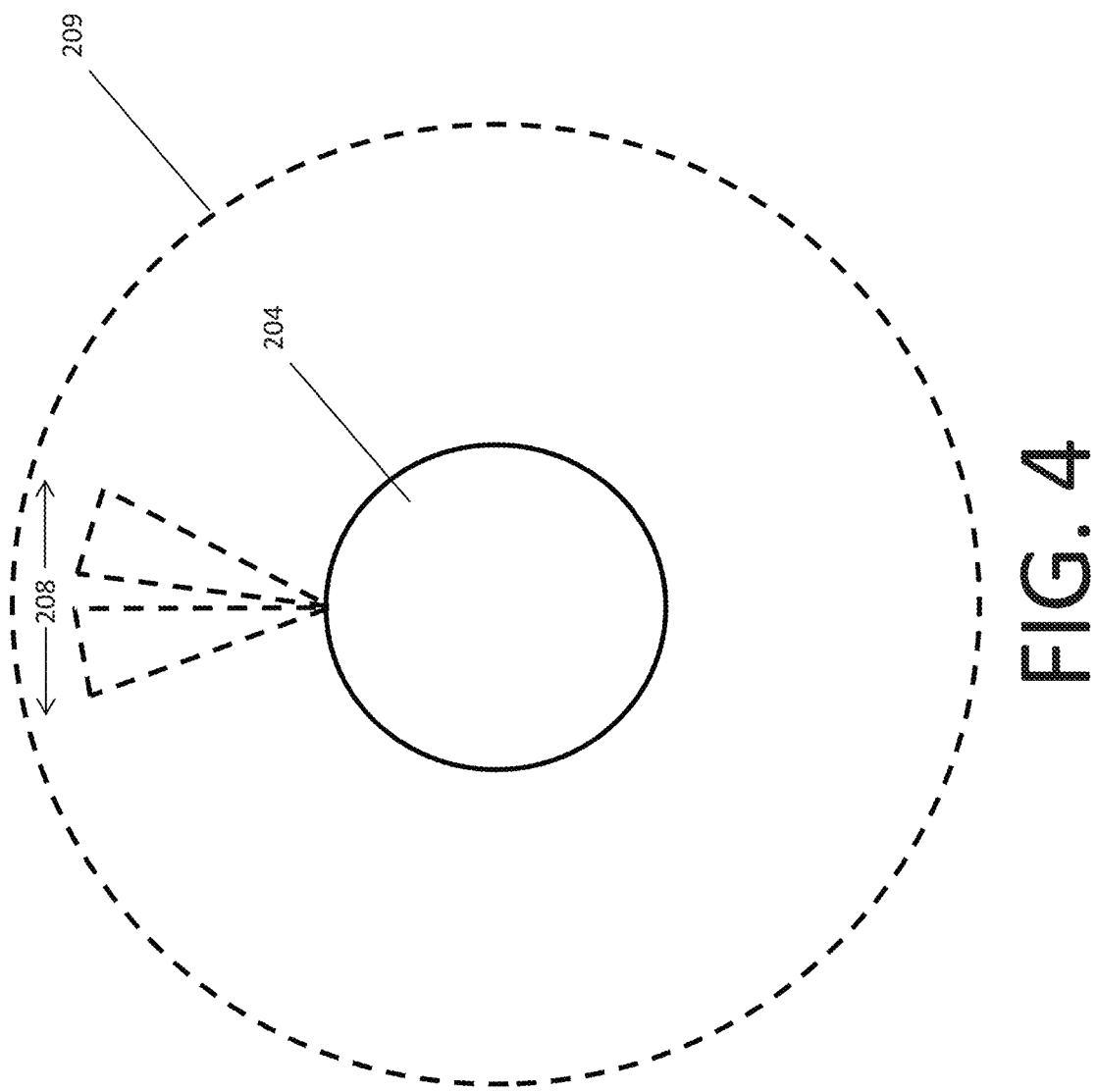

Fixed-distance AR/MR systems are configured to display virtual objects near/adjacent (i.e., within about 0.2 diopters to about 0.6 diopters from) a single predetermined distance in the Z direction away from the user (i.e., "depth plane") for a partial AR experience/scenario. Referring now to FIG. 2, it should be appreciated that single-plane focus fixed-distance AR/MR systems typically display frames at one fixed depth plane 202. The visual effect for a user of a fixed-distance AR/MR system is that the user is presented with a virtual dome of displayed images in front of and centered on the user. The dome 206 is represented as 2-D arc in FIG. 3, where the virtual dome 206 of displayed images is in front of the user. While a user may have a stationary left to right field of view ("FOV") 208 of about 50°, effective L/R FOV will be about 180° due to head rotation, as shown in FIG. 3 in a "body-centric" system (described below). In addition, the user's FOV can cover the entire dome 206 with up and down head movement. Accordingly, a fixed-distance AR/MR system can present image information to a user over the entire dome 206 surrounding the user 204. In another embodiment with a stationary user having freedom of body and head rotation, the effective FOV can be an entire sphere 209, as shown in FIG. 4. While FIGS. 3 and 4 represents the dome 206 and sphere 209 of images presented by a fixed-distance AR/MR system in 2-D, it should be understood that the dome 206 and sphere 209 are three dimensional surfaces.

Fixed-distance AR/MR systems can be implemented with, for each eye, a single volume phase hologram, surface-relief hologram, or light-guiding optical element ("LOE") embedded with depth plane information to generate images that appear to originate within a tolerance range of (e.g., within about 0.2 diopters to about 0.6 diopters from) the predetermined depth plane. Fixed-distance AR/MR systems can generate a 3-D effect by using stereoscopic technique (i.e., displaying respective images for each eye at slightly different distances in the Z direction within a tolerance range of the predetermined distance).

While the human visual system is very accurate with respect to vergence, it has some tolerance for differences in accommodation (i.e., focus) before vergence-accommodation reflex related problems arise. Though specific to a particular user, tolerance/uncertainty in accommodation typically occurs between about 0.2 diopters to about 0.6 diopters relative to vergence. Accordingly, the fixed-distance AR/MR systems disclosed herein take advantage of the human visual system's tolerance for differences in accommodation to display 3-D objects near a single predetermined distance in the Z direction, in particular at ranges beyond a user's arm length.

Because a diopter is the inverse of distance from a user's eye (see FIG. 1), the tolerance/uncertainty in accommodation, which is constant in diopters, varies in terms of linear distance. For illustrative purposes, at a first distance of 1.00 m (=1.0 diopter) from a user, adding 0.2 diopters (the lower range of typical tolerances) would result in a second distance of 0.83 m, a change of −17 cm. Similarly, 0.2 diopters in the opposite direction corresponds to a distance of 1.25 m, for a total range of 0.83 m to 1.25 m for content to be viewed within accommodation tolerances of 0.2 diopters if displayed at 1.00 m (in other words, a range of 42 cm for a fixed-distance AR/MR system to display content at 1.00 m within tolerance of 0.2 diopters).

On the other hand, for a first distance of 0.50 m (=2.0 diopters) from a user, adding 0.6 diopters would result in a second distance of 0.38 m, a change of −12 cm. Moving a corresponding 0.6 diopters away from the 0.50 m first distance results in a distance of 0.71 m, a change of 21 cm or a total range of 33 cm for a fixed AR/MR system to display content at 0.5 m within tolerances of 0.6 diopters. As compared to the 42 cm range of a 1.00 m fixed-distance AR/MR system with 0.2 diopter tolerance, tripling the tolerance to 0.6 (the other extreme of diopter tolerance) actually decreased the range of content projection for the nearer 0.5 m first distance system. Accordingly, a fixed distance system with more precise (i.e. lower) accommodation tolerances will have greater functional ranges for displaying content at fixed distances further from a user A fixed-distance AR/MR system employing the tolerance ranges of the present invention around a single optical plane can greatly simplify functionality if content display/rendering is permitted only when such content would appear within certain ranges of a predetermined optical place from a user, preferably at larger distances to maximize tolerance ranges across different users. Similarly, in some embodiments, certain content may be configured to only appear within certain ranges if the optical power establishing the position of a predetermined optical plane of the fixed-distance AR/MR system is known, or a user's particular preferred tolerance is determined.

Figure 5:
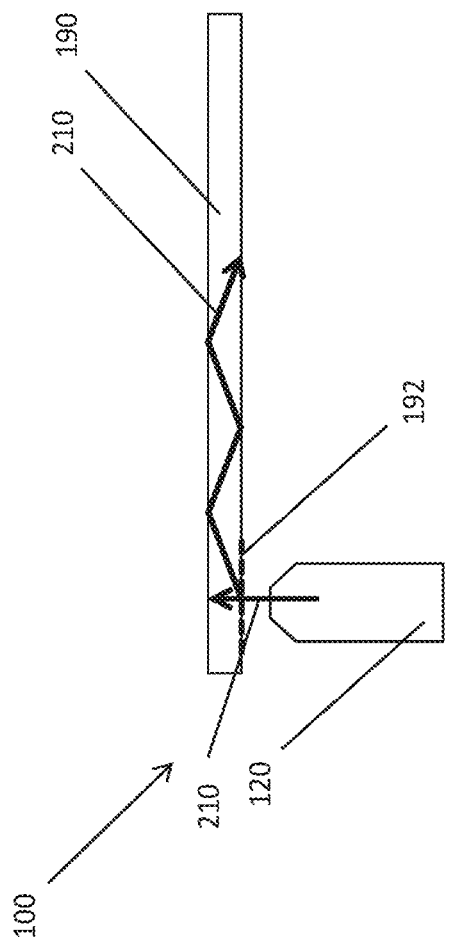
FIG. 5 is a detailed schematic view of an optical system according to one embodiment.

Table 1 depicts ranges relative to a predetermined optical plane at a fixed-distance from a user that permit content display within diopter tolerances according to some embodiments. Table 1 illustrates the tight ranges that content may be displayed for near-to-user optical planes (see the 0.5 m predetermined optical plane distances), regardless of diopter tolerances, as opposed to the further optical planes that enable greater ranges of content display.

diffractive optical elements may be of any type, including volumetric or surface relief. In one embodiment, the ICG 192 can be a reflection-mode aluminized portion of the LOE 190. In another embodiment, the ICG 192 can be a transmissive diffractive portion of the LOE 190. When the system 100 is in use, a "virtual" light beam 210 from the light source 120 enters the LOE 190 via the ICG 192 and propagates along the LOE 190 by substantially total internal reflection ("TIR") for display to an eye of a user. The light beam 210 is "virtual" because it encodes an image of a non-existent "virtual" object or a portion thereof as directed by the system 100. It is understood that although only one beam 210 is illustrated in FIG. 5, a multitude of beams, which encode an image, may enter the LOE 190 from a wide range of angles through the same ICG 192. The range of angles of entry is related to the FOV achievable for the system 100. A light beam "entering" or being "admitted" into an LOE includes, but is not limited to, the light beam interacting with the LOE so as to propagate along the LOE by substantially TIR. The system 100 depicted in FIG. 5 can include various light sources 120 (e.g., LEDs, OLEDs, lasers, and masked broad-area/broad-band emitters). In other embodiments, light from the light source 120 may also be delivered to the LOE 190 via fiber optic cables (not shown).

Figure 6:
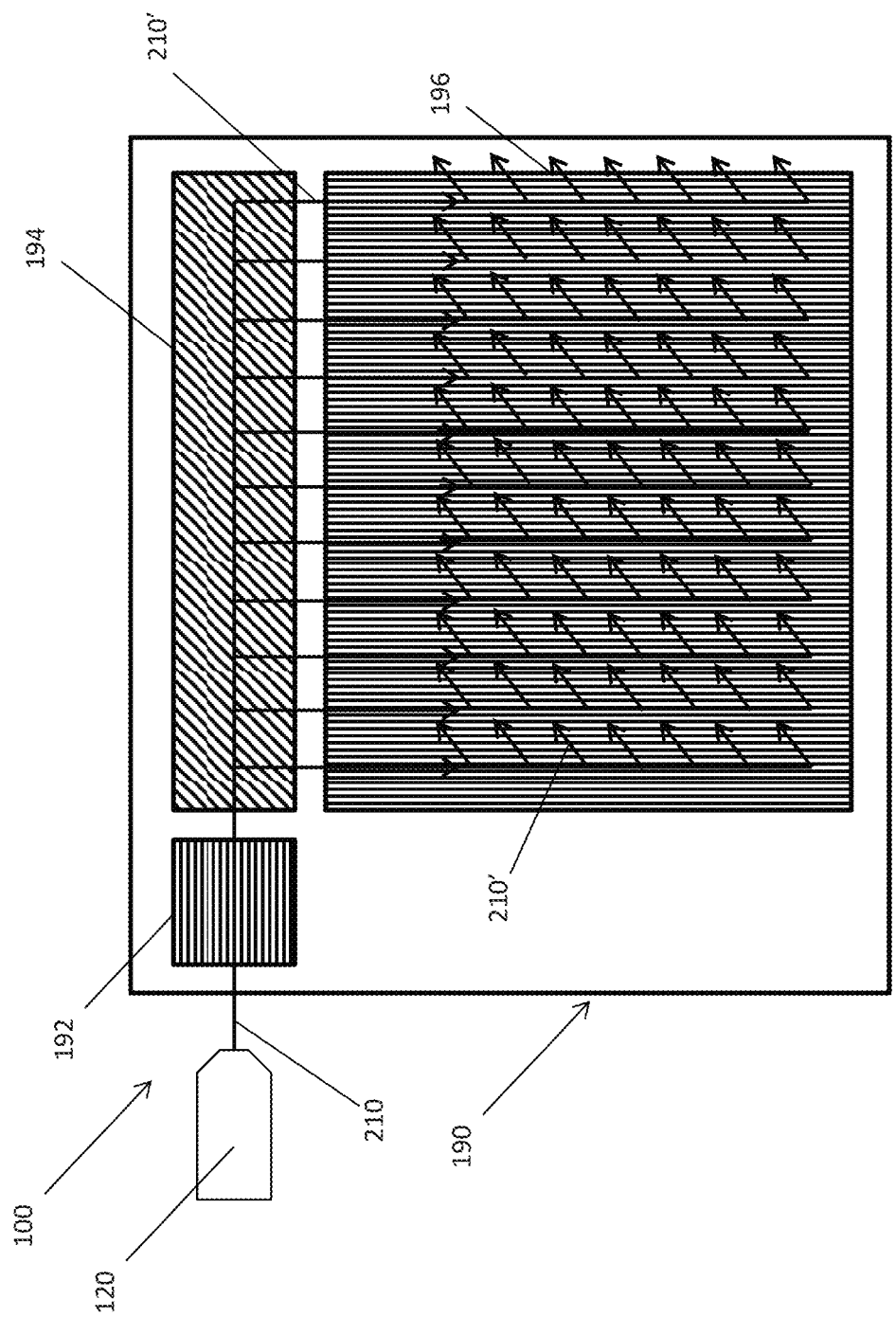
FIG. 6 is a detailed schematic view of a light-guiding optical element of an optical system according to one embodiment.

As shown in FIG. 6, a portion of the LOE 190 in a fixed-distance optical system 100 can function as an exit pupil expander 196 ("EPE") to increase the numerical aperture of a light source 120 in the Y direction, thereby

| Fixed-distance of predetermined optical plane from a user | 0.2 diopters tolerance | | | 0.6 diopters tolerance | | |
|---|---|---|---|---|---|---|
| | near limit (from user) | far limit (from user) | total range | near limit (from user) | far limit (from user) | total range |
| 0.5 m (2 diopters) | 45 cm | 56 cm | 11 cm | 38 cm | 71 cm | 33 cm |
| 1.0 m (1 diopter) | 83 cm | 125 cm | 42 cm | 63 cm | 250 cm | 187 cm |
| 1.67 m (⅗ diopter = 0.6) | 125 cm | 250 cm | 125 cm | 83 cm | optical infinity | N/A |
| 2.0 m (½ diopter) | 143 cm | 333 cm | 190 cm | 91 cm | optical infinity | N/A |
| 4.0 m (¼ diopter) | 222 cm | 2000 cm | 1778 cm | 118 cm | optical infinity | N/A |
| 5.0 m (⅕ diopter = 0.2) | 308 cm | optical infinity | N/A | 125 cm | optical infinity | N/A |

Table 1 In some embodiments, a tolerance range for a fixed-distance AR/MR system can set rendering domains, such that content that does not appear within a range will not render and thus will save battery life, or content can specifically be programmed to appear within certain distances from a user so as to remain within tolerances of the predetermined optical plane.

In some embodiments, a user may elect a tolerance, either by a functionality (i.e. choosing a fixed-distance AR embodiment that practically would only need to render content within certain distances, for example a virtual computer screen), or by prescription (i.e. recognizing that the user experiences discomfort when exceeding certain diopter tolerances). Such election is akin to selecting customized and simplified AR devices for a particular setting, as opposed to a more complex AR/MR system intended to serve all use cases.

FIG. 5 depicts portions of a fixed-distance optical system 100 for projecting images at a single depth plane. The system 100 includes a light source 120 and an LOE 190 having a diffractive optical element (not shown) and an in-coupling grating 192 ("ICG") associated therewith. The increasing the resolution of the system 100. Since the light source 120 produces light of a small diameter/spot size, the EPE 196 expands the apparent size of the pupil of light exiting from the LOE 190 to increase the system resolution. The system 100 may further comprise an orthogonal pupil expander 194 ("OPE") in addition to an EPE 196 to expand the light in both the X (OPE) and Y (EPE) directions. More details about the EPEs 196 and OPEs 194 are described in the above-referenced U.S. Utility patent application Ser. No. 14/555,585, the contents of which have been previously incorporated by reference.

FIG. 6 depicts an LOE 190 having an ICG 192, an OPE 194 and an EPE 196. FIG. 6 depicts the LOE 190 from a top view that is similar to the view from a user's eyes. The ICG 192, OPE 194, and EPE 196 may be any type of DOE, including volumetric or surface relief. The ICG 192 is a DOE (e.g., a linear grating) that is configured to admit a virtual light beam 210 from a light source 120 for propagation by TIR. In the system 100 depicted in FIG. 6, the light source 120 is disposed to the side of the LOE 190.

The OPE 194 is a DOE (e.g., a linear grating) that is slanted in the lateral plane (i.e., perpendicular to the light path) such that a virtual light beam 210 that is propagating through the system 100 will be deflected by 90 degrees laterally. The OPE 194 is also partially transparent and partially reflective along the light path, so that the light beam 210 partially passes through the OPE 194 to form multiple (e.g., eleven) beamlets 210'. In the depicted system 100, the light path is along an X axis, and the OPE 194 configured to bend the beamlets 210' to the Y axis.

The EPE 196 is a DOE (e.g., a linear grating) that is slanted in a Z plane (i.e., normal to the X and Y directions) such that the beamlets 210' that are propagating through the system 100 will be deflected by 90 degrees in the Z plane and toward a user's eye. The EPE 196 is also partially transparent and partially reflective along the light path (the Y axis), so that the beamlets 210' partially pass through the EPE 196 to form multiple (e.g., seven) beamlets 210'. Only select beams 210 and beamlets 210' are labeled for clarity.

The OPE 194 and the EPE 196 are both also at least partially transparent along the Z axis to allow real-world light (e.g., reflecting off real-world objects) to pass through the OPE 194 and the EPE 196 in the Z direction to reach the user's eyes. For AR/MR systems 100, the ICG 192 is at least partially transparent along the Z axis also at least partially transparent along the Z axis to admit real-world light.

Figure 7:
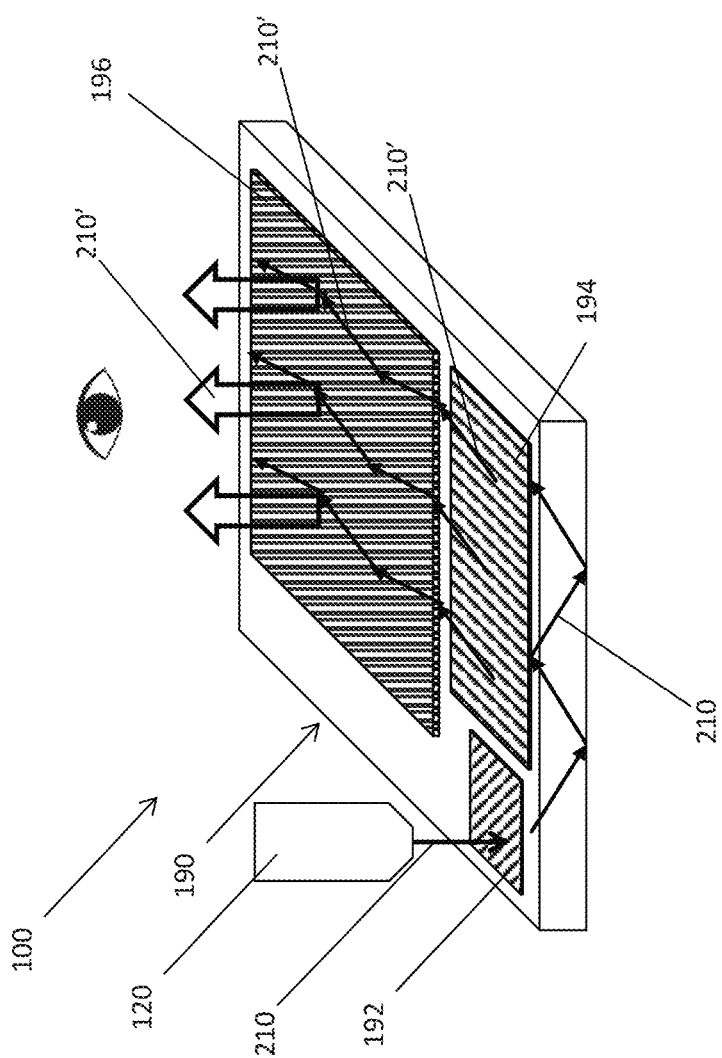
FIG. 7 is a detailed perspective view of a light-guiding optical element of an optical system according to one embodiment.

FIG. 7 depicts another fixed-distance optical system 100 including an LOE 190 having an ICG 192, an OPE 194, and an EPE 196. The system 100 also includes a light source 120 configured to direct a virtual light beam 210 into the LOE 190 via the ICG 192. The light beam 210 is divided into beamlets 210' by the OPE 194 and the EPE 196 as described with respect to FIG. 6 above. Further, as the beamlets 210' propagate through the EPE 196, they also exit the LOE 190 via the EPE 196 toward the user's eye. In the system 100 depicted in FIG. 7, the light source 120 is disposed orthogonal to the LOE 190. Only select beams 210 and beamlets 210' are labeled for clarity. Fixed-distance mixed reality optical systems may be implemented independently of AR/MR systems, but many systems herein are described in relation to AR/MR systems for illustrative purposes only.

Figure 8A:
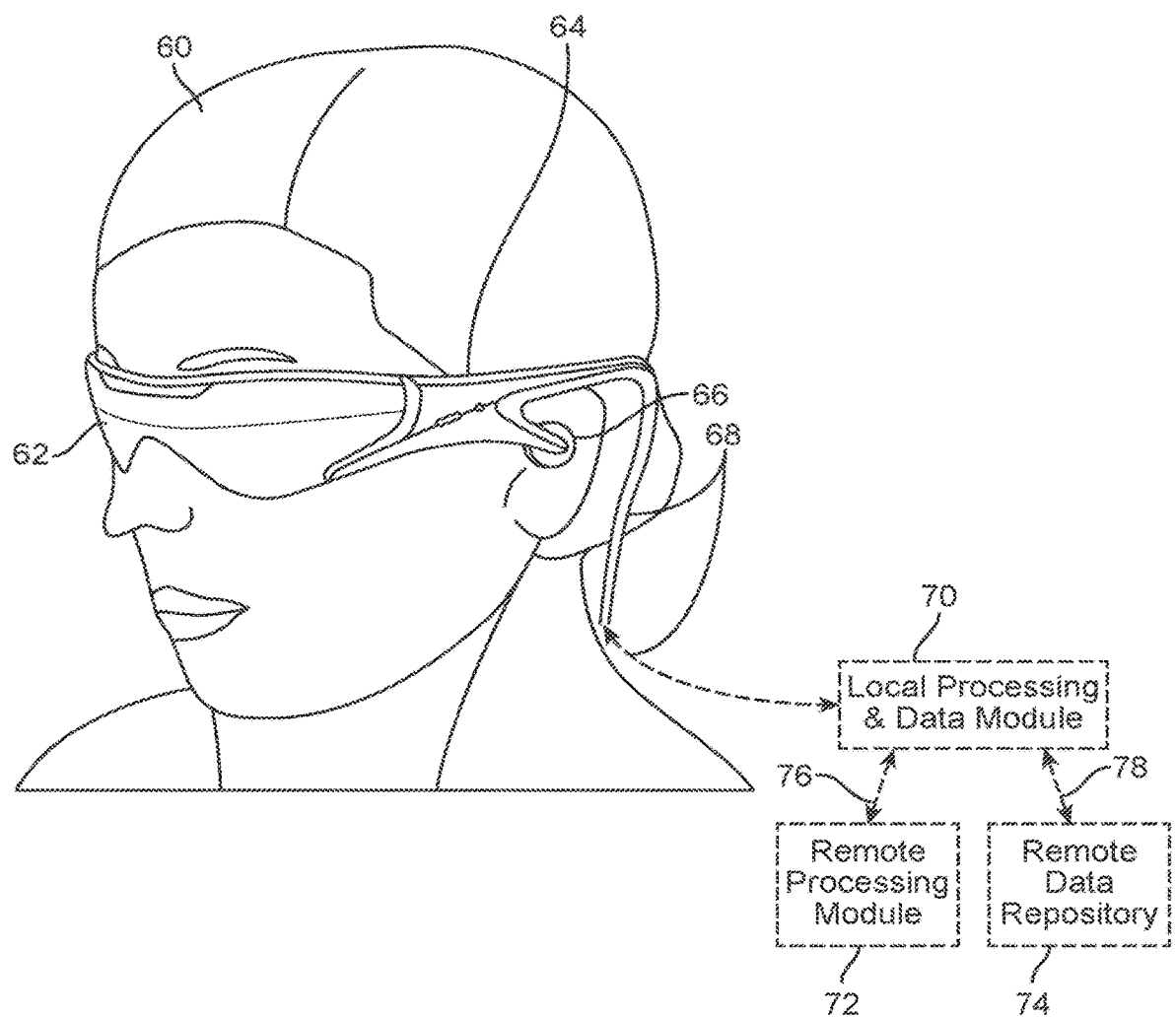
FIGS. 8A to 8D and 9A to 9D are schematic views of augmented reality/user identification systems according to various embodiments.
Figure 8B:
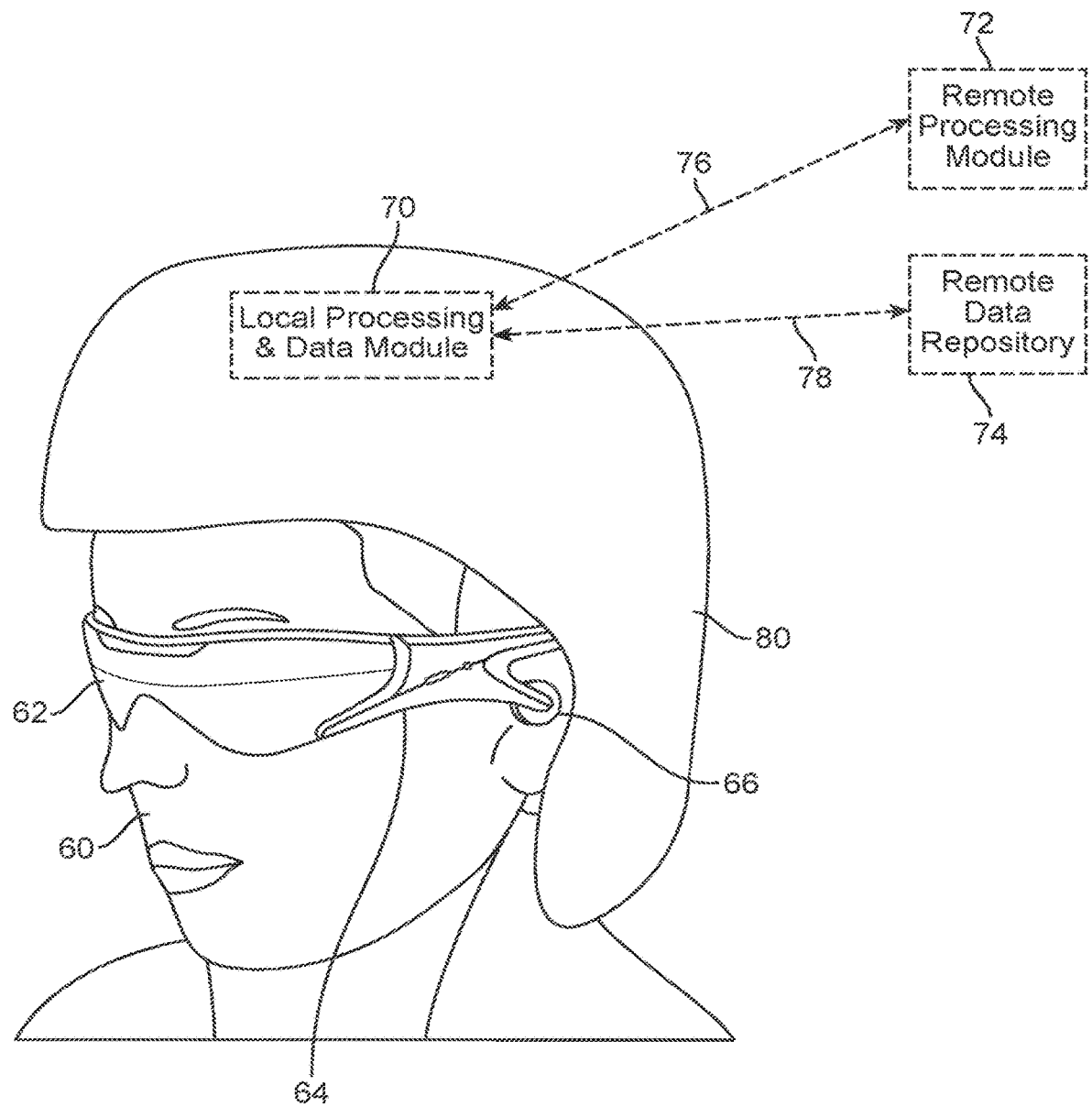

Referring now to FIGS. 8A-8D, some general AR/MR system component options are illustrated. As shown in FIG. 8A, a head-mounted device user 60 is depicted wearing a frame 64 structure coupled to a display system 62 positioned in front of the eyes of the user 60. The following describes possible components of a general AR/MR system. The described components are not all necessary to implement a fixed-distance AR/MR system.

Figure 8C:
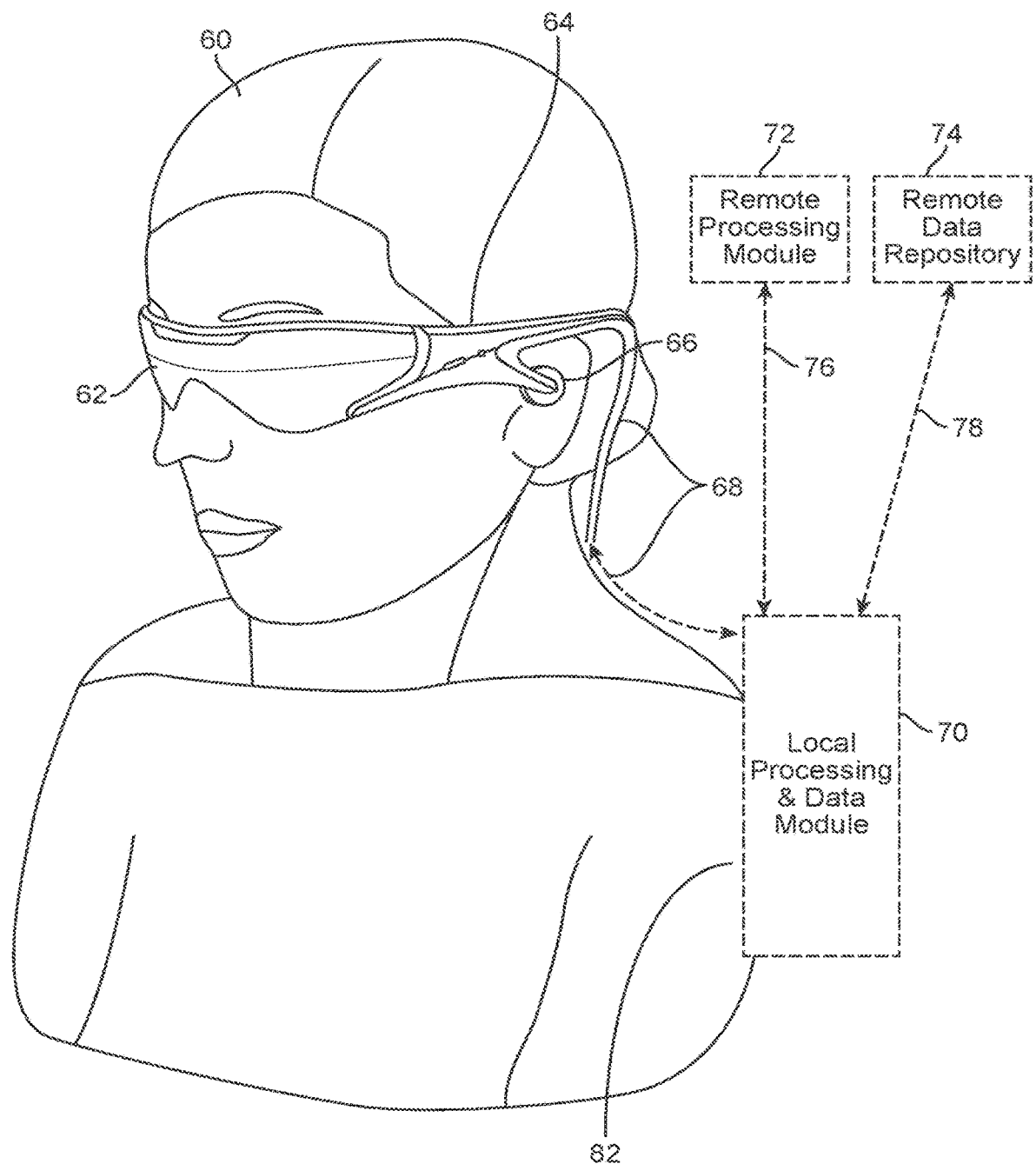
Figure 8D:
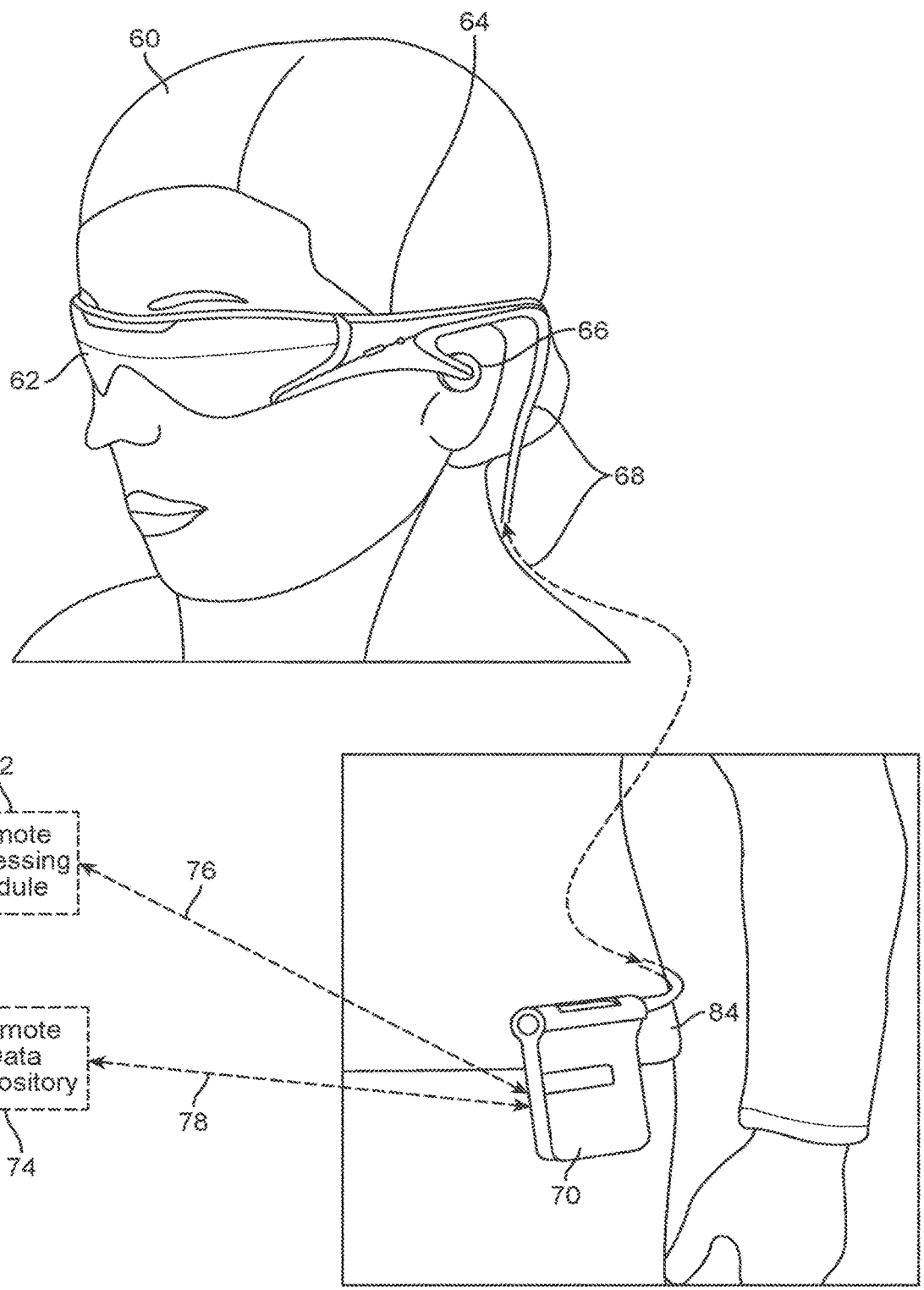

Although not needed to implement a fixed-distance AR/MR system, a speaker 66 may be coupled to the frame 64 in the depicted configuration and positioned adjacent the ear canal of the user 60. In an alternative embodiment, another speaker (not shown) is positioned adjacent the other ear canal of the user 60 to provide for stereo/shapeable sound control. In one or more embodiments, the fixed-distance AR/MR system may have a display 62 that is operatively coupled, such as by a wired lead or wireless connectivity, to a local processing and data module 70, which may be mounted in a variety of configurations, such as fixedly attached to the frame 64, fixedly attached to a helmet or hat 80 as shown in the embodiment depicted in FIG. 8B, embedded in headphones, removably attached to the torso 82 of the user 60 in a backpack-style configuration as shown in the embodiment of FIG. 8C, or removably attached to the hip 84 of the user 60 in a belt-coupling style configuration as shown in the embodiment of FIG. 8D.

The local processing and data module 70 may comprise a power-efficient processor or controller, as well as digital memory, such as flash memory, both of which may be utilized to assist in the processing, caching, and storage of data. The data may be captured from sensors which may be operatively coupled to the frame 64, such as image capture devices (such as cameras), and inertial measurement units (including accelerometers and gyroscopes). Optional sensors, which are not needed to implement a fixed-distance AR/MR system, include compasses, microphones, GPS units, and radio devices. Alternatively or additionally, the data may be acquired and/or processed using the remote processing module 72 and/or remote data repository 74, possibly for passage to the display 62 after such processing or retrieval. The local processing and data module 70 may be operatively coupled 76, 78, such as via a wired or wireless communication links, to the remote processing module 72 and the remote data repository 74 such that these remote modules 72, 74 are operatively coupled to each other and available as resources to the local processing and data module 70.

In one embodiment, the remote processing module 72 may comprise one or more relatively powerful processors or controllers configured to analyze and process data and/or image information. In one embodiment, the remote data repository 74 may comprise a relatively large-scale digital data storage facility, which may be available through the internet or other networking configuration in a "cloud" resource configuration. In one embodiment, all data is stored and all computation is performed in the local processing and data module, allowing fully autonomous use from any remote modules.

In one or more embodiments, a head-worn fixed-distance AR/MR system similar to the ones shown in FIGS. 8A-8D may be used to display virtual images to a user within a tolerance range of a predetermined distance from the user. It should be appreciated that while a number of the embodiments described below may be implemented in head-worn systems, other embodiments may be implemented in stationary devices. For illustrative purposes, the disclosure will mainly focus on head-worn fixed-distance AR/MR system, but it should be appreciated that the same principles may be applied to non-head-worn and non-AR embodiments as well.

In one or more embodiments, the fixed-distance AR/MR system is typically fitted for a particular user's head, and the optical components are aligned to the user's eyes. These configuration steps may be used in order to ensure that the user is provided with an optimum augmented reality experience without causing any physiological side-effects, such as headaches, nausea, discomfort, etc. Thus, in one or more embodiments, the user-worn fixed-distance AR/MR system is configured (both physically and digitally) for each individual user, and a set of programs may be calibrated specifically for the user. In other scenarios, a loose fitting AR device may be used comfortably by a variety of users. For example, in some embodiments, the user worn fixed-distance AR/MR system knows a distance between the user's eyes, a distance between the head worn display and the user's eyes, and a curvature of the user's forehead. All of these measurements may be used to provide a head-worn fixed-distance AR/MR system customized to fit a given user. In other embodiments, such measurements may not be necessary in order to perform the AR display functions.

Figure 9A:
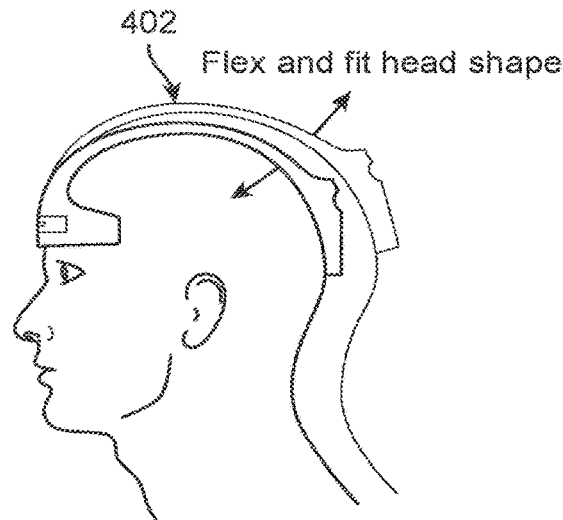
Figure 9B:
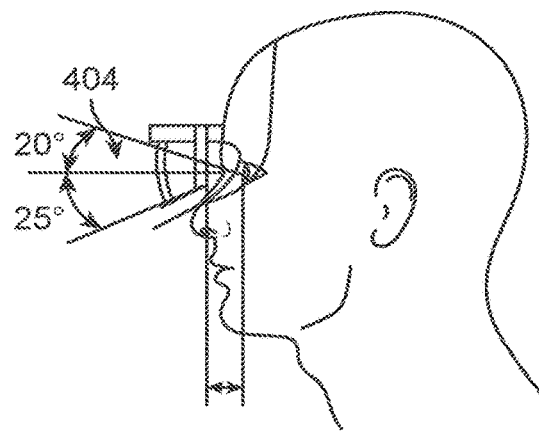
Figure 9C:
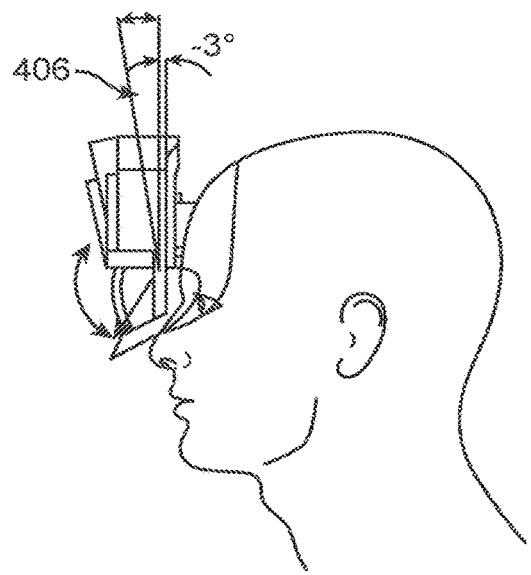
Figure 9D:
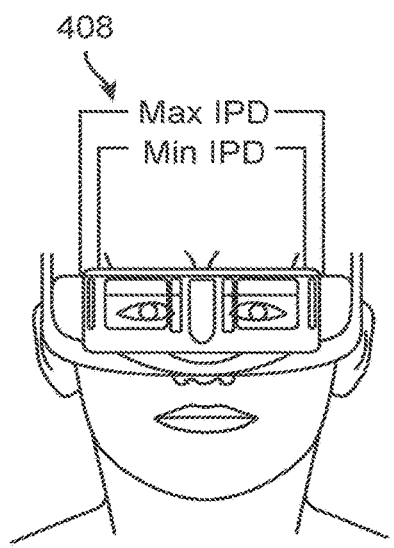

For example, referring to FIGS. 9A-9D, the fixed-distance AR/MR system may be customized for each user. The user's head shape 402 may be taken into account when fitting the head-mounted user-worn user identification system, in one or more embodiments, as shown in FIG. 9A. Similarly, the eye components 404 (e.g., optics, structure for the optics, etc.) may be rotated or adjusted for the user's comfort both horizontally and vertically, or rotated for the user's comfort, as shown in FIG. 9B. In one or more embodiments, as shown FIG. 9C, a rotation point of the head set with respect to the user's head may be adjusted based on the structure of the user's head. Similarly, the inter-pupillary distance (IPD) (i.e., the distance between the user's eyes) may be compensated for, as shown in FIG. 9D.

Figure 10:
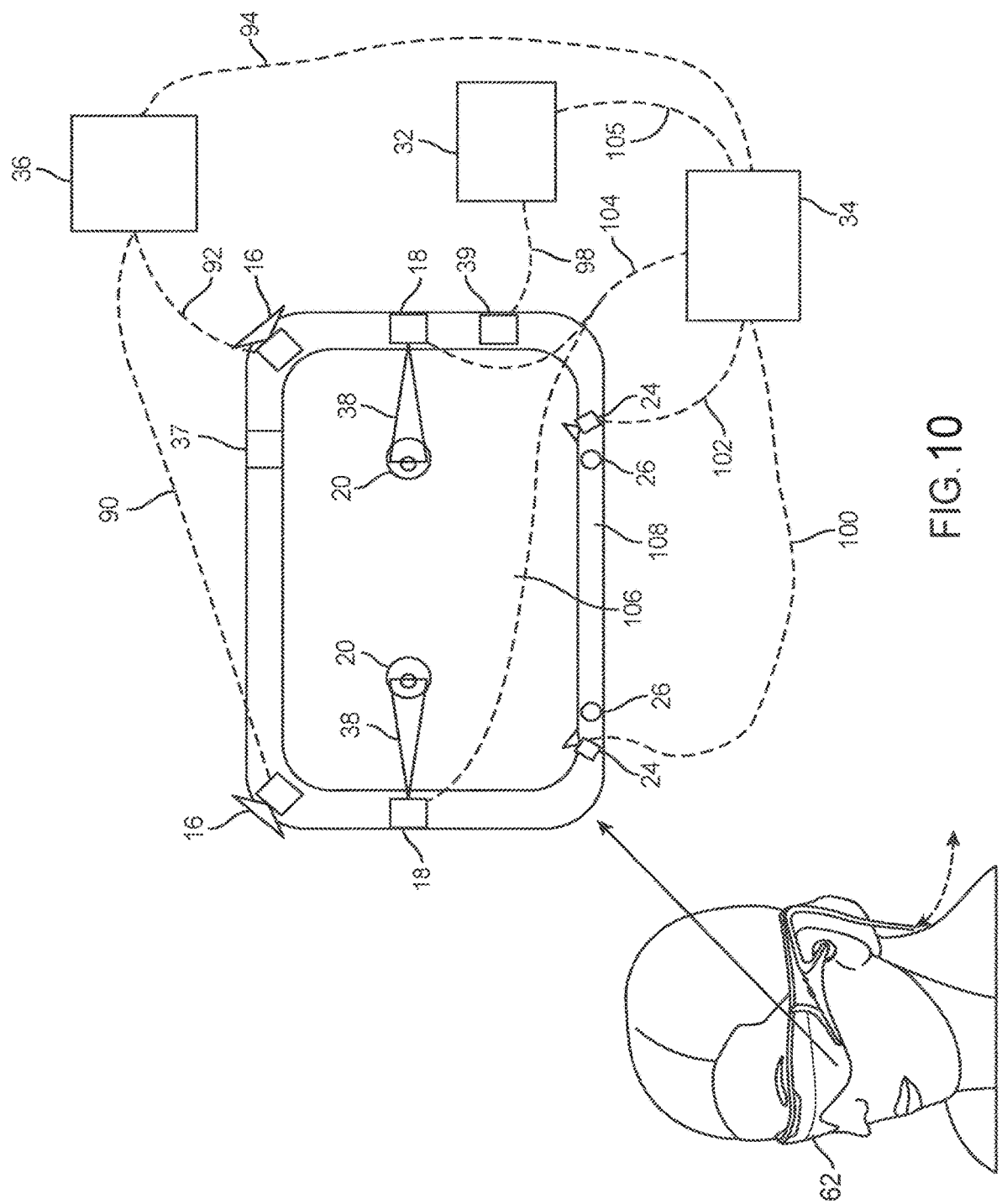
FIG. 10 is a detailed schematic view of a multiple-plane focus full augmented reality system.

Referring now to FIG. 10, the various components of an exemplary full AR/MR system will be described. It should be appreciated that a fixed-distance AR/MR system will have fewer components than a full AR/MR system. However, describing an exemplary full AR/MR system will illustrate the interconnections and functions of the components of a fixed-distance AR/MR system. FIG. 10 provides a basic idea of the various components of an AR/MR system or AR device. FIG. 10 shows a simplified version of the head-mounted AR/MR system 62 in the block diagram to the right for illustrative purposes.

Referring to FIG. 10, one embodiment of a suitable user display device 62 is shown, comprising a display lens 106 which may be mounted to a user's head or eyes by a housing or frame 108. The user display device 62 is a full AR/MR system that is configured to perform a variety of functions, including displaying 3-D virtual objects to a user that appear at various distances away from the user. The display lens 106 may comprise one or more transparent mirrors positioned by the housing 84 in front of the user's eyes 20 and configured to bounce projected light 38 into the eyes 20 and facilitate beam shaping, while also allowing for transmission of at least some light from the local environment. In the depicted embodiment, two wide-field-of-view machine vision cameras 16 are coupled to the housing 108 to image the environment around the user; in one embodiment these cameras 16 are dual capture visible light/infrared light cameras. The depicted system also comprises a pair of scanned-laser shaped-wavefront (i.e., for depth) light projector modules 18 (e.g., spatial light modulators such as DLP, fiber scanning devices (FSDs), LCDs, etc.) with display mirrors and optics configured to project light 38 into the eyes 20 as shown.

While not necessary to implement a fixed-distance AR/MR systems, the depicted full AR/MR system also comprises two miniature infrared cameras 24 paired with infrared light sources 26 (such as light emitting diodes or "LEDs"), which are configured to track the eyes 20 of the user to support rendering and user input. These infrared cameras 24 are also configured to continuously and dynamically capture images of the user's eyes, especially the iris thereof, which can be utilized in user identification.

The system further features a sensor assembly 39, which may comprise X, Y, and Z axis accelerometer capability as well as a magnetic compass and X, Y, and Z axis gyro capability, preferably providing data at a relatively high frequency, such as 200 Hz. An exemplary sensor assembly 39 is an inertial measurement unit ("IMU"). The depicted system 62 also comprises a head pose processor 36 ("image pose processor"), such as an ASIC (application specific integrated circuit), FPGA (field programmable gate array), and/or ARM processor (advanced reduced-instruction-set machine), which may be configured to calculate real or near-real time user head pose from wide field of view image information output from the capture devices 16. The head pose processor 36 is operatively coupled (90, 92, 94; e.g., via wired or wireless connectivity) to the cameras 16 and the rendering engine 34.

Also shown is another processor 32 ("sensor pose processor") configured to execute digital and/or analog processing to derive pose from the gyro, compass, and/or accelerometer data from the sensor assembly 39. The depicted system also features a GPS (global positioning system) subsystem 37 to assist with pose and positioning. In addition, the GPS may further provide cloud-based information about the user's location. This information may be used for user identification purposes. For example, if the user identification algorithm can narrow the detected user characteristics to two potential user identities, a user's current and historical location data may be used to eliminate one of the potential user identities.

Finally, the depicted system comprises a rendering engine 34 which may feature hardware running a software program configured to provide rendering information local to the user to facilitate operation of the scanners and imaging into the eyes of the user, for the user's view of the world. The rendering engine 34 is operatively coupled 94, 100, 102, 104, 105 (i.e., via wired or wireless connectivity) to the image pose processor 36, the optional eye tracking cameras 24, the projecting subsystem 18, and the sensor pose processor 32 such that rendered light 38 is projected using a scanned laser arrangement 18 in a manner similar to a retinal scanning display. The wavefront of the projected light beam 38 may be bent or focused to coincide with a desired focal distance of the projected light 38.

The optional miniature infrared eye tracking cameras 24 may be utilized to track the eyes to support rendering and user input (e.g., where the user is looking, what depth he is focusing, etc.) As discussed below, eye verge may be utilized to estimate a depth of a user's focus. The GPS 37, and the gyros, compasses and accelerometers in the sensor assembly 39 may be utilized to provide coarse and/or fast pose estimates. The camera 16 images and sensor pose information, in conjunction with data from an associated cloud computing resource, may be utilized to map the local world and share user views with a virtual or augmented reality community and/or user identification system.

While much of the hardware in the display system 62 featured in FIG. 10 is depicted directly coupled to the housing 108 which is adjacent the display 106 and the eyes 20 of the user, the hardware components depicted may be mounted to or housed within other components, such as a belt-mounted component, as shown, for example, in FIG. 8D.

In one full AR/MR system, all of the components of the system 62 featured in FIG. 10 are directly coupled to the display housing 108 except for the image pose processor 36, sensor pose processor 32, and rendering engine 34, and communication between the latter three and the remaining components of the system 62 may be by wireless communication, such as ultra-wideband, or wired communication. The depicted housing 108 preferably is head-mounted and wearable by the user. It may also feature speakers, such as those which may be inserted into the ears of a user and utilized to provide sound to the user.

Figure 11:
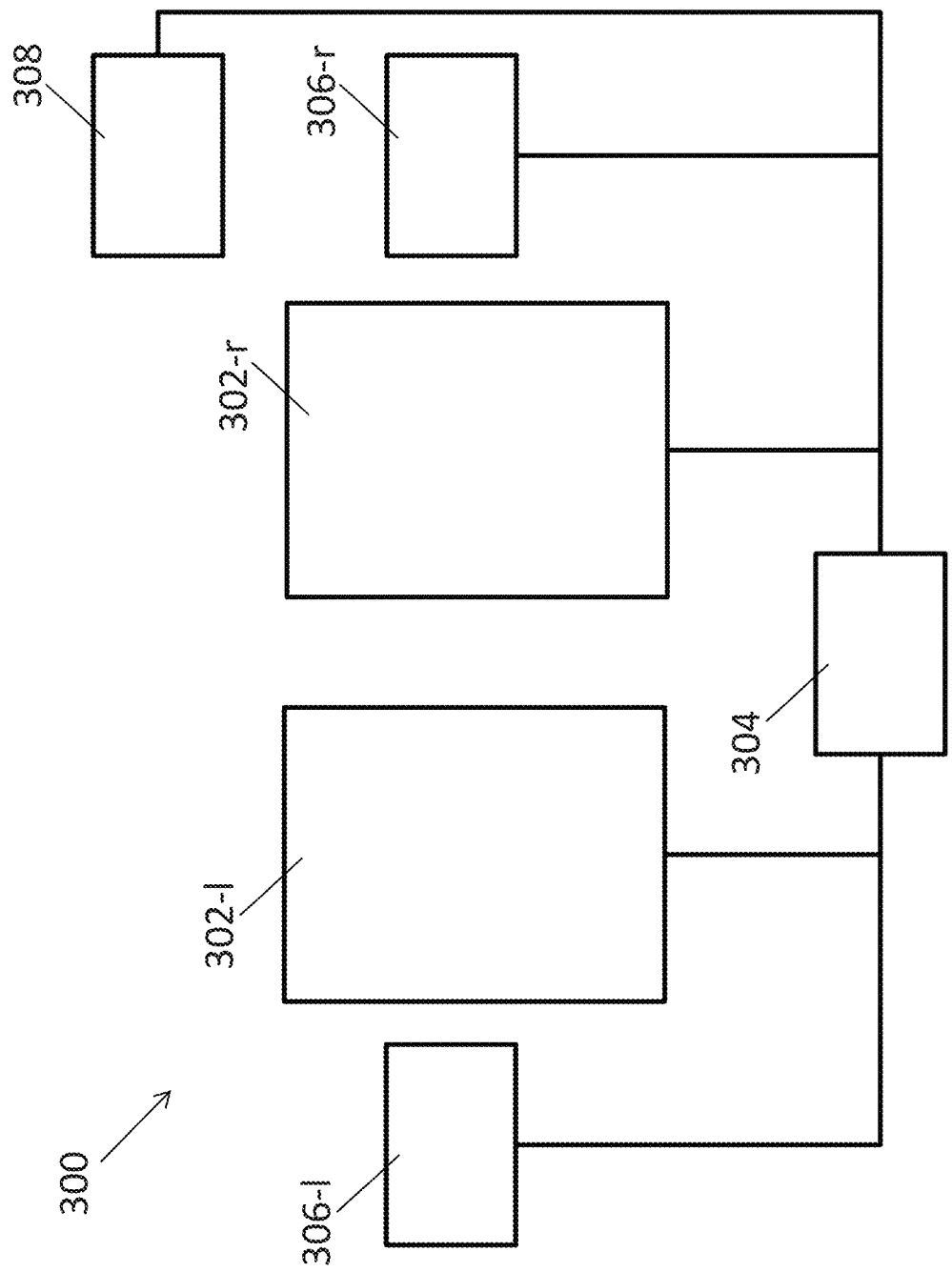
FIGS. 11 and 12 are detailed schematic views of single-plane focus fixed-distance augmented reality systems according to two embodiments.

Having described the general components of the full AR/MR system 62 depicted in FIG. 10, a fixed-distance AR/MR system 300 will now be described with reference to FIG. 11. The fixed-distance AR/MR system 300 includes a pair of light guiding optical elements 302-*l*, 302-*r* configured to receive light from respective light sources (not shown) and direct the received light into a user's left and right eyes, respectively. The light from the light sources can be modulated by respective spatial light modulators (not shown) to include image data corresponding to a 3-D virtual object. For instance, light directed to the left and right LOEs 302-*l*, 302-*r* can be encoded with image data corresponding to the same 3-D virtual object from two slightly different points of view. The points of view correspond to the positions of the left and right LOEs 302-*l*, 302-*r*, which are calibrated for the user's left and right eyes. Accordingly, the light delivered through the left and right LOEs 302-*l*, 302-*r* generates an image of a 3-D virtual object for the user using a stereoscopic technique.

The fixed-distance AR/MR system 300 is configured to generate images of 3-D virtual objects that appear near a fixed-distance away from the user, i.e., the point of vergence of the LOEs 302-*l*, 302-*r*. As discussed above, the human visual system has a tolerance/uncertainty in accommodation of about 0.2 diopters to about 0.6 diopters. Because the fixed-distance AR/MR system 300 is configured to focus the images of the 3-D virtual object within that tolerance range of the fixed-distance, the system can display images of 3-D virtual objects without noticeable accommodation and vergence issues.

While the light sources and the spatial light modulators are described as separate components, the spatial light modulators can be parts of the respective light sources. In another embodiment, a single light source and a single spatial light modulator (whether separate or combined) can provide modulated light beams for both the left and right LOEs 302-*l*, 302-*r* in a time sequential manner. As long as the light beams are provided at a rate of at least about 60 frames per second per LOE (e.g., 120 frames per second for the single light source embodiment), the fixed-distance AR/MR system 300 can render a 3-D virtual object that smoothly moves with minimal motion artifacts.

To that end, the fixed-distance AR/MR system 300 also includes a controller 304 operatively coupled to the other components of the system 300 to coordinate those components. For instance, the controller 304 may include a 3-D rendering engine to generate image data for the left and right LOEs 302-*l*, 302-*r* configured to render a 3-D virtual object and send the data to the respective light sources and spatial light modulators. In single light source/spatial light modulator embodiments, the controller 304 may activate the left LOE 302-*l* and deactivate the right LOE 302-*r* when the single light source/spatial light modulator generates light encoded with image data configured for the left LOE 302-*l*. This would minimize crosstalk between the left and right LOEs 302-*l*, 302-*r* and artifacts associated therewith. The controller 304 may be a processor in a head mounted fixed-distance AR/MR system 300. In other embodiments, the controller 304 can be a processor in a mobile computer (e.g., a cell phone) or a portion thereon that is wirelessly connected to the other components of the fixed-distance AR/MR system 300.

The fixed-distance AR/MR system 300 further includes left and right IMUs 306-*l*, 306-*r* configured to provide data to determine a head pose of a user/wearer of the head mounted fixed-distance AR/MR system 300. While a single IMU is capable of providing data to determining a user head pose, two IMUs 306-*l*, 306-*r* provides additional data, which improves the determination of the head pose. In one embodiment, once the gyroscopes in the left and right IMUs 306-*l*, 306-*r* are calibrated, the system 300 will be able to track the direction in which a user's head and eye sockets are pointed. While the depicted embodiment of a fixed-distance AR/MR system 300 does not include eye tracking cameras and IR lights, the left and right IMUs 306-*l*, 306-*r* provide a practical estimate of the direction in which a user is looking using head pose.

Moreover, the fixed-distance AR/MR system 300 includes an outwardly facing image capture device 308 (e.g., a camera) to capture images approximating the user's field of view. The image capture device sends the captured image data to the controller 304, which performs machine vision optical flow to correct drift resulting from movement of the system 300 and the image capture device 308, which is coupled to the head-mounted portion of the system 300. The image capture device 308 can be a visible and/or infrared light camera such as a CCD camera.

The fixed-distance AR/MR system 300, using the left and right LOEs 302-*l*, 302-*r*, the controller 304, the left and right IMUs 306-*l*, 306-*r*, and the image capture device 308, can generate and render 3-D images of a virtual object in a field of view a user such that the user can view the 3-D images without noticeable accommodation and vergence issues. The left and right LOEs 302-*l*, 302-*r* project images into the left and right eyes respectively. The controller 304 renders the images (to generate a 3-D image for the user). The left and right IMUs 306-*l*, 306-*r* provide data the controller 304 uses to determine the user's head pose. The image capture device 308 provides image data used to correct drift in the system 300. The controller 304 uses the data provided by the left and right IMUs 306-*l*, 306-*r* and the image capture device 308 to render the appropriate images for the user's left and right eyes based on the head pose of the user and system drift.

Figure 12:
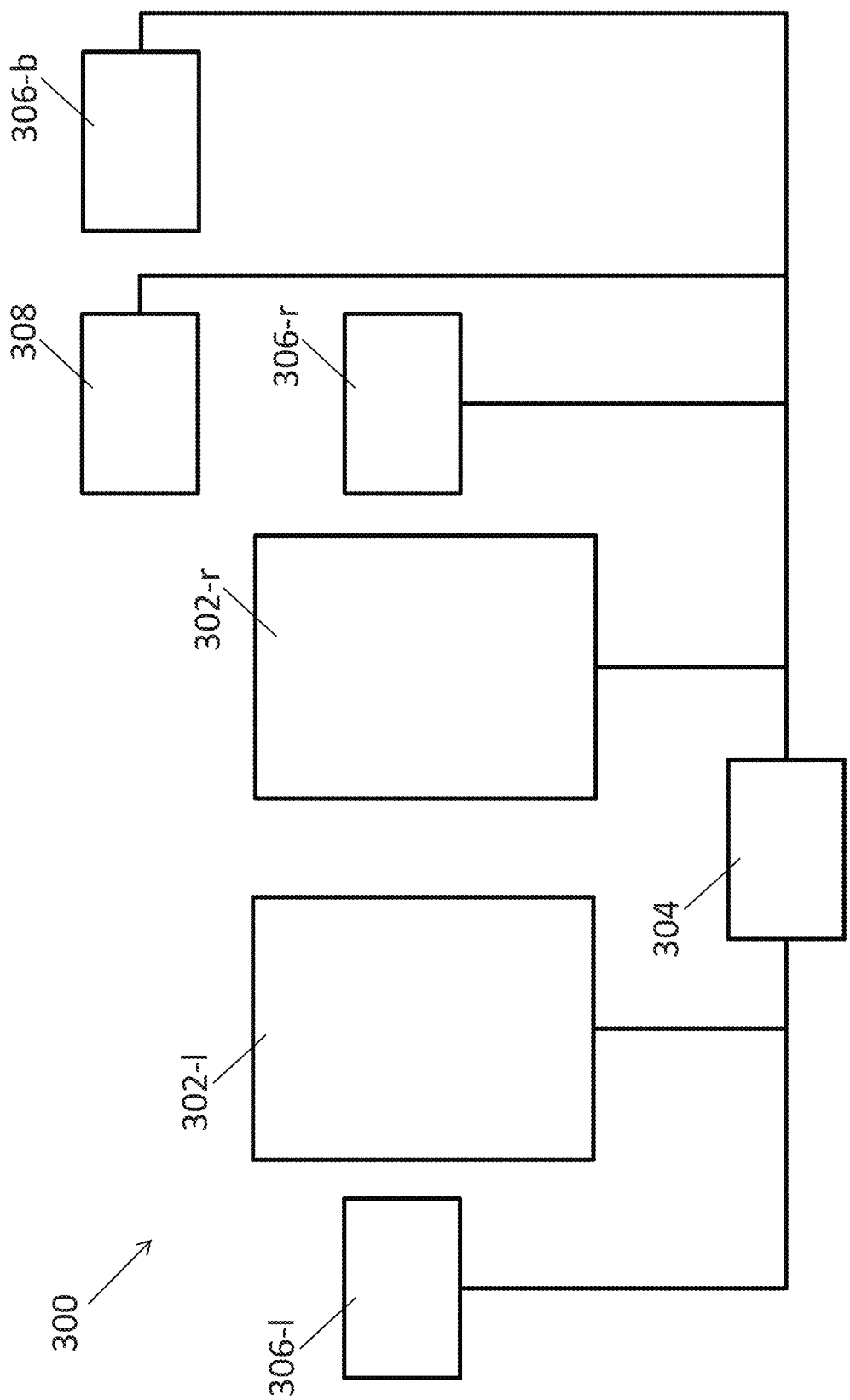

In another embodiment, depicted in FIG. 12, the fixed-distance AR/MR system 300 also includes left and right LOEs 302-*l*, 302-*r*, a controller 304, left and right IMUs 306-*l*, 306-*r*, and an image capture device 308. These components are operatively coupled and function as described above for the same components in the fixed-distance AR/MR system 300 depicted in FIG. 11. In addition, the fixed-distance AR/MR system 300 depicted in FIG. 12 includes a third or "body" IMU 306-*b*, which is fixed to the user's body (e.g., attached to a user's belt). In other embodiments, the body IMU 306-*b* is fixed to or a part of the user's cell phone, but the body IMU 306-*b* is only active when the phone is fixed to the user's belt (e.g., in a holder). The body IMU 306-*b* is configured to provide data to determine a body pose of a user of the fixed-distance AR/MR system 300. Once the gyroscopes in the body IMU 306-*b* are calibrated, the system 300 will be able to track the direction in which a user's body is pointed.

Figure 13:
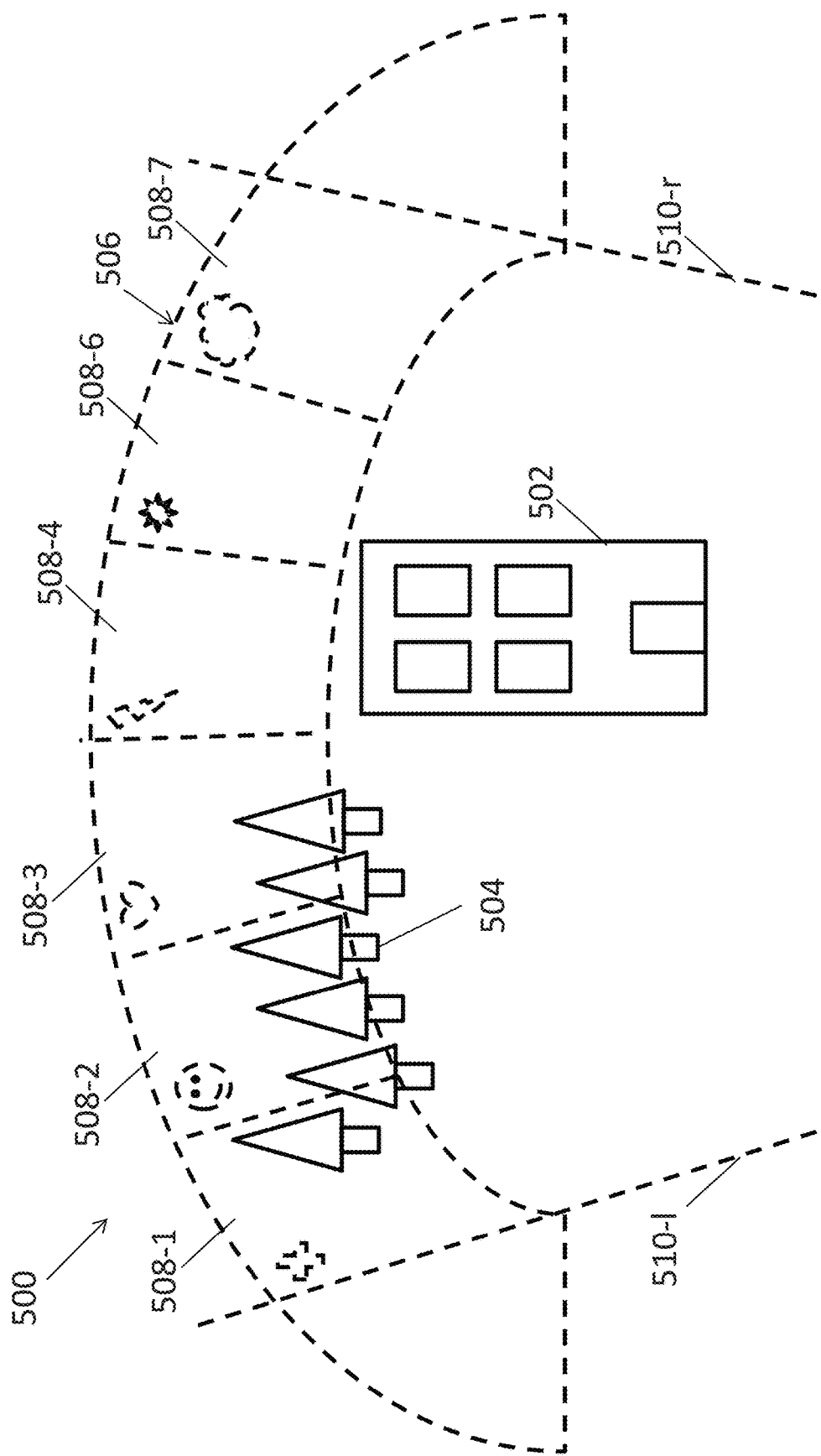
FIG. 13 illustrates a field-of-view of a user of a single-plane focus fixed-distance augmented reality system according to one embodiment.

The controller 304 uses the data from the body IMU 306-*b* to generate a "body-centric" fixed-distance AR scenario. For instance, the controller 304 can generate a user interface 506 in a FOV 500 of and at a fixed distance from a user, as shown in FIG. 13. Unlike a "head-centric" AR scenario, which is simply an overlay on top of the real world scene that moves with motion of the user's head, a body-centric fixed-distance AR scenario "sticks" the user interface 506 at a fixed distance from and a fixed point relative to the body of the user and moves to a different portion of the user interface 506 when the user's head turns toward that portion. This is accomplished by the controller 304 comparing data from the body IMU 306-*b* with data from the left and right IMUs 306-*l*, 306-*r* to determine the head pose relative to the body pose.

Exemplary Virtual Object (User Interface)

FIG. 13 depicts a FOV 500 of a user wearing a head-mounted fixed-distance AR/MR system 300, such as the one depicted in FIG. 12. The user can see in the FOV 500 a real physical building 502 and a real copse of trees 504. The use can also see in the FOV 500 a user interface 506 generated and rendered by the fixed-distance AR/MR system 300. The user interface 506 has sufficient opacity to allow the user to see the trees 504 behind the user interface 506. This opacity is illustrated by depicting the user interface 506 with broken lines. The user interface 506 includes six user interface objects 508-1 to 508-6. The FOV 500 is limited on the left 510-*l* and right 510-*r* sides by the limitations of the user's eyes. The limited FOV 500 is about 50°.

Figure 14:
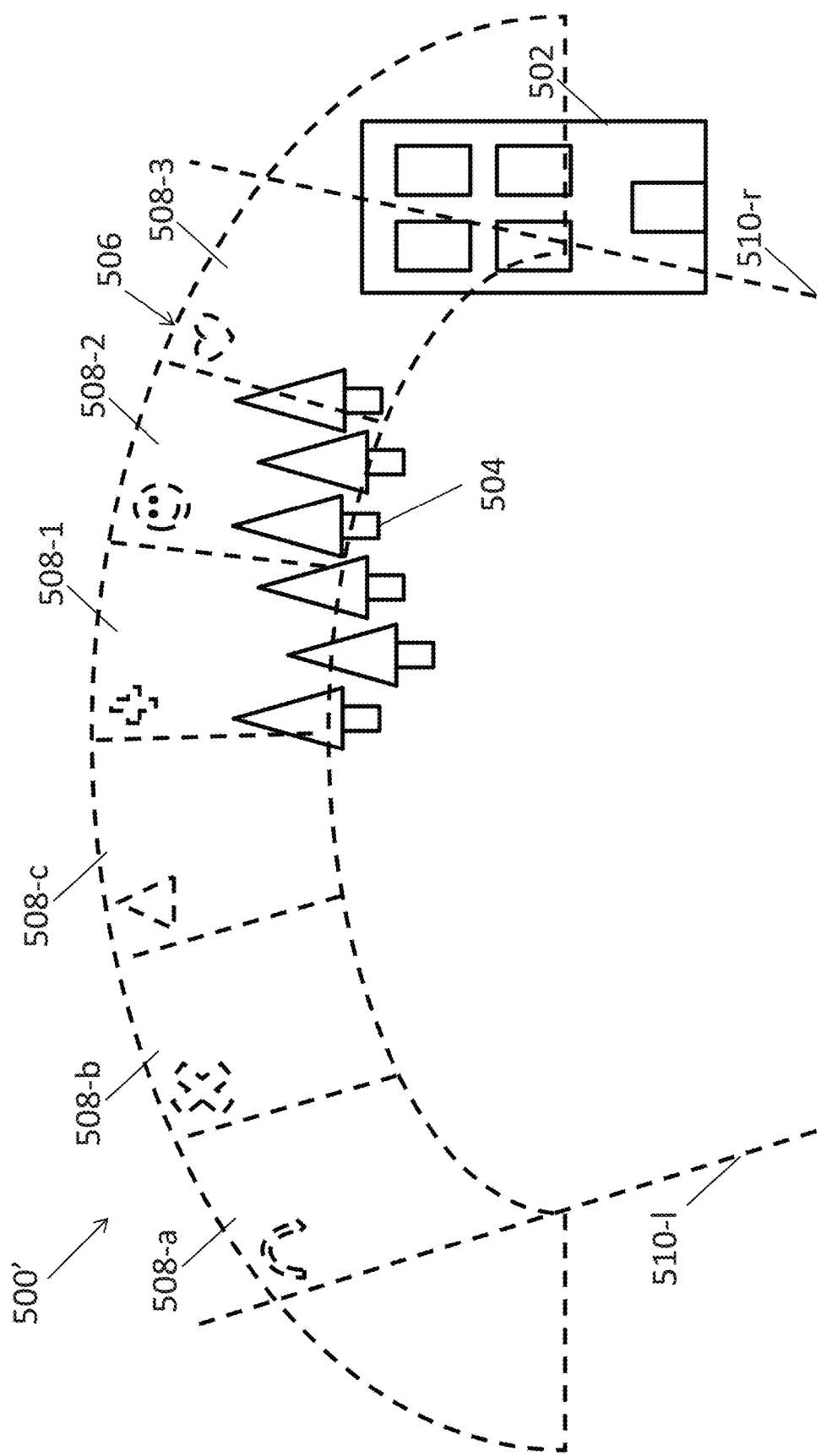
FIG. 14 illustrates the field-of-view of the user of the single-plane focus fixed-distance augmented reality system according to the embodiment depicted in FIG. 13 after the user's head has rotated relative to the user's body.

FIG. 14 depicts another FOV 500' of the same user wearing the same head-mounted fixed-distance AR/MR system 300 after the user's head has turned to the left by about 25° relative to the user's body. The building 502 and trees 504 have moved to the right side 510-*r* of the FOV. In fact, the right half of the building 502 has moved out of the FOV 500'. Because the head-mounted fixed-distance AR/MR system 300 is configured to generate and render a body-centric user interface 506, after turning their head, the user can see a different portion of the user interface 506. For instance, user interface objects 508-*a*, 508-*b* and 508-*c* are visible to the user in FOV 500' depicted in FIG. 14, but not in FOV 500 depicted in FIG. 13. At the same time, user interface objects 508-4, 508-5 and 508-6 are not visible to the user in FOV 500' depicted in FIG. 14, but they are visible in FOV 500 depicted in FIG. 13. This ability to scan left and right allow for a larger total effective FOV than the approximately 50° FOV of the human eye. The increase in the total effective FOV is not limited to the left and right directions, but also includes up and down, thereby forming a dome 206 on which the head-mounted fixed-distance AR/MR system 300 may render virtual images (see FIG. 3). While FIGS. 13 and 14 depict a 2-D user interface 506, it should be noted that the virtual image can be a stereoscopically rendered 3-D image as described above.

The fixed-distance AR/MR system 300 described above can perform the function of displaying a virtual object in a body-centric manner while minimizing the complexity, size and cost of the system 300. This economic use of optical system components can result in AR/MR systems (and other optical systems) that are easier to manufacture, more comfortable to use, and more affordable for the typical consumer/user.

Body-Centric Display of Virtual Object

Figure 15:
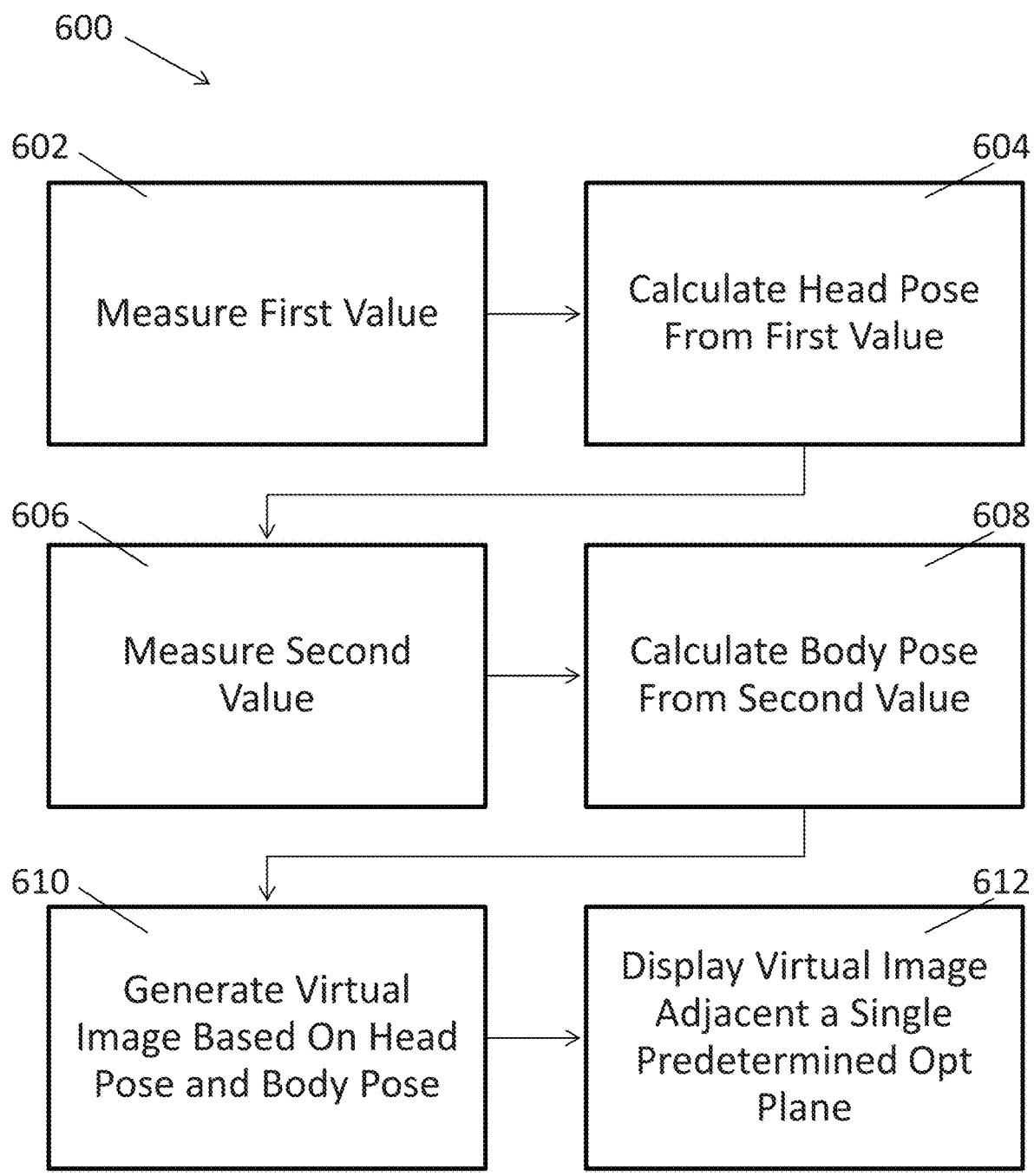
FIGS. 15 and 16 are flow charts depicting methods for displaying a virtual object in a body-centric manner to a user of a single-plane focus fixed-distance augmented reality system according to two embodiments.
Figure 16:
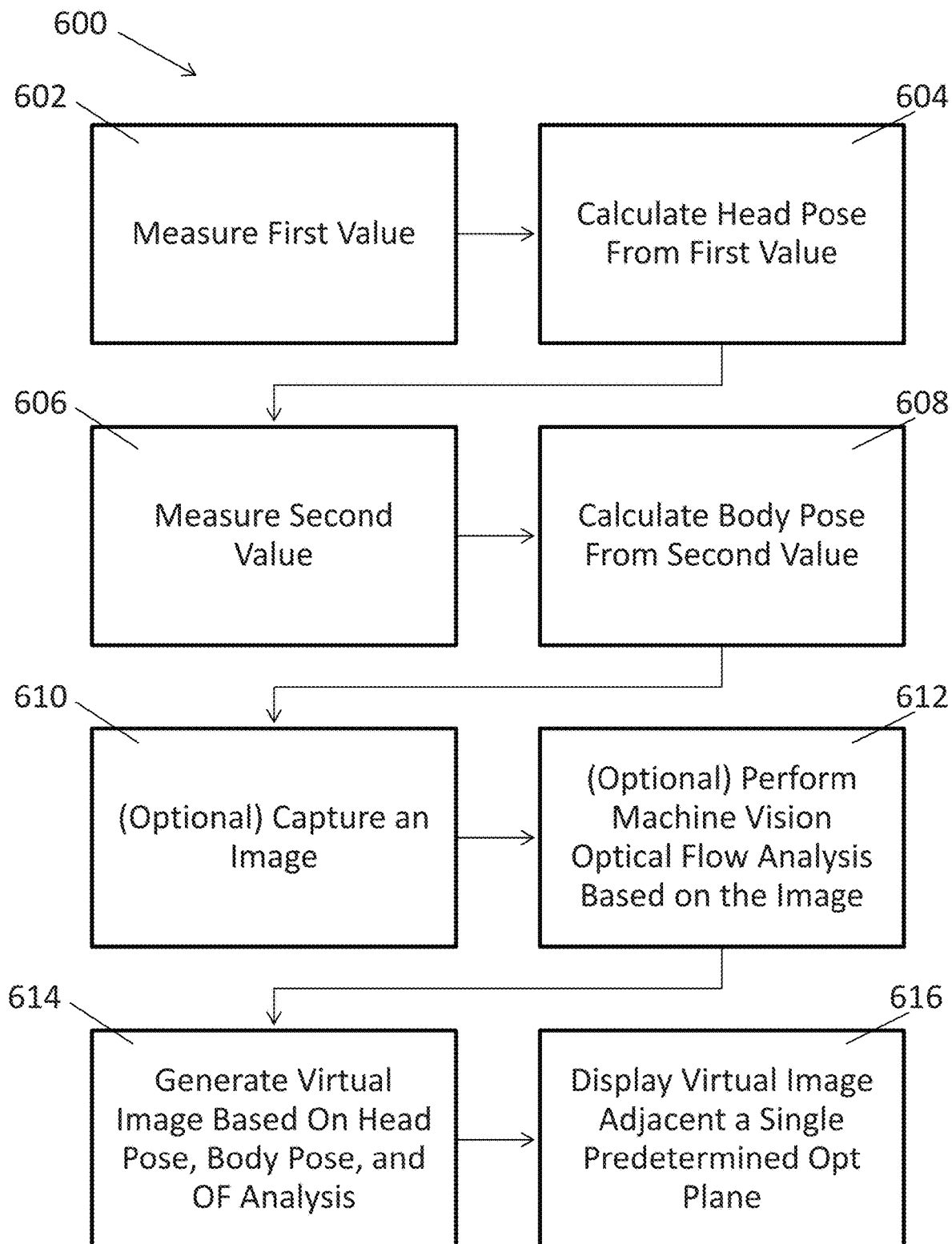

Having described several embodiments of fixed-distance AR/MR systems 300, a method 600 of displaying a virtual object (e.g., a user interface 506 as in FIG. 14) in a body-centric manner to a user of a fixed-distance AR/MR system 300 will now be discussed. As shown in FIG. 15, the method begins at step 602 with measuring a first value relating to a head pose. For instance, the left IMU 306-*l* (see FIG. 14) in the fixed-distance AR/MR system 300 may measure gyroscopic data indicative of a head pose.

At step 604, a head pose is calculated from the first value. For instance, the controller 304 in the fixed-distance AR/MR system 300 may calculate a head pose from the measured gyroscopic data.

At step 606, a second value relating to body pose is measured. For instance, the body IMU 306-*b* (see FIG. 14) in the fixed-distance AR/MR system 300 may measure gyroscopic data indicative of a body pose.

At step 608, a body pose is calculated from the second value. For instance, the controller 304 in the fixed-distance AR/MR system 300 may calculate a body pose from the measured gyroscopic data.

At step 610, a virtual image configured to be displayed within a tolerance range of a single predetermined optical plane is generated based on the head pose and the body pose. For instance, the 3-D rendering engine of the controller 304 in the fixed-distance AR/MR system 300 may render a virtual image configured to be displayed in the FOV of a user based on the user's head pose relative to the user's body pose. The 3-D rendering engine may alter the virtual image generated based on the user's head pose relative to the user's body pose (compare FIGS. 13 and 14). The virtual image may be a part of the user interface 506 depicted in FIGS. 13 and 14. The virtual image may be a part of a 3-D image (e.g., the left image of a pair of images configured to render a 3-D image when simultaneously displayed to the left and right eyes of a user).

At step 612, the generated virtual image is displayed within a tolerance range of the single predetermined optical plane. As explained above, displaying the virtual image "adjacent" the single predetermined optical plane includes, but is not limited to, displaying the virtual image within about 0.2 diopters to about 0.6 diopters of the single predetermined optical plane. For instance, the light source, the spatial light modulator, and the left LOE 302-*l* (see FIG. 14) in the fixed-distance AR/MR system 300 may display the generated virtual image to a user. The single predetermined optical plane may be selected such that the vergence of the user's left eye (based on the angle of the light emitted by the left LOE 302-*l*) corresponds to the focus of the virtual image within a tolerance range of the single predetermined optical plane. Such correspondence minimizes or eliminates problems related to vergence-accommodation conflict.

FIG. 19 depicts another method 600' of displaying a virtual object (e.g., a user interface 506 as in FIG. 14) in a body-centric manner to a user of a fixed-distance AR/MR system 300. Steps 602, 604, 606, 608, and 612 are identical to the corresponding steps in the method 600 depicted in FIG. 18.

The method 600' depicted in FIG. 19 is different from the method 600 depicted in FIG. 18 because at optional step 614, an image is captured. For instance, the image acquisition device 308 (see FIG. 14) in the fixed-distance AR/MR system 300 may capture an image approximating the FOV of the user.

At optional step 616, machine vision optical flow analysis is performed based on the captured image. The optical flow analysis corrects drift resulting from movement of the system. For instance, the controller 304 in the fixed-distance AR/MR system 300 may perform the machine vision optical flow analysis based on the captured image.

At step 610, a virtual image configured to be displayed within a tolerance range of a single predetermined optical plane is generated based on the head pose, the body pose, and the result of the machine vision optical flow analysis. For instance, the 3-D rendering engine of the controller 304 in the fixed-distance AR/MR system 300 may render a virtual image configured to be displayed in the FOV of a user based on the head pose, the body pose, and the result of the machine vision optical flow analysis. The 3-D rendering engine may alter the virtual image generated based on the user's head pose relative to the user's body pose (compare FIGS. 13 and 14). Including the result of the machine vision optical flow analysis in rendering the virtual image corrects system drift and results in a more accurately rendered virtual image. The virtual image may be a part of the user interface 506 depicted in FIGS. 13 and 14. The virtual image may be a part of a 3-D image (e.g., the left image of a pair of images configured to render a 3-D image when simultaneously displayed to the left and right eyes of a user).

The above-described fixed-distance AR/MR systems are provided as examples of various common systems that can benefit from reduced complexity, size and cost. Accordingly, use of the fixed-distance optical systems described herein is not limited to the disclosed fixed-distance AR/MR systems, but rather applicable to any optical system.

Various exemplary embodiments of the invention are described herein. Reference is made to these examples in a non-limiting sense. They are provided to illustrate more broadly applicable aspects of the invention. Various changes may be made to the invention described and equivalents may be substituted without departing from the true spirit and scope of the invention. In addition, many modifications may be made to adapt a particular situation, material, composition of matter, process, process act(s) or step(s) to the objective(s), spirit or scope of the present invention. Further, as will be appreciated by those with skill in the art that each of the individual variations described and illustrated herein has discrete components and features which may be readily separated from or combined with the features of any of the other several embodiments without departing from the scope or spirit of the present inventions. All such modifications are intended to be within the scope of claims associated with this disclosure.

The invention includes methods that may be performed using the subject devices. The methods may comprise the act of providing such a suitable device. Such provision may be performed by the end user. In other words, the "providing" act merely requires the end user obtain, access, approach, position, set-up, activate, power-up or otherwise act to provide the requisite device in the subject method. Methods recited herein may be carried out in any order of the recited events which is logically possible, as well as in the recited order of events.

Exemplary aspects of the invention, together with details regarding material selection and manufacture have been set forth above. As for other details of the present invention, these may be appreciated in connection with the above-referenced patents and publications as well as generally known or appreciated by those with skill in the art. The same may hold true with respect to method-based aspects of the invention in terms of additional acts as commonly or logically employed.

In addition, though the invention has been described in reference to several examples optionally incorporating various features, the invention is not to be limited to that which is described or indicated as contemplated with respect to each variation of the invention. Various changes may be made to the invention described and equivalents (whether recited herein or not included for the sake of some brevity) may be substituted without departing from the true spirit and scope of the invention. In addition, where a range of values is provided, it is understood that every intervening value, between the upper and lower limit of that range and any other stated or intervening value in that stated range, is encompassed within the invention.

Also, it is contemplated that any optional feature of the inventive variations described may be set forth and claimed independently, or in combination with any one or more of the features described herein. Reference to a singular item, includes the possibility that there are plural of the same items present. More specifically, as used herein and in claims associated hereto, the singular forms "a," "an," "said," and "the" include plural referents unless the specifically stated otherwise. In other words, use of the articles allow for "at least one" of the subject item in the description above as well as claims associated with this disclosure. It is further noted that such claims may be drafted to exclude any optional element. As such, this statement is intended to serve as antecedent basis for use of such exclusive terminology as "solely," "only" and the like in connection with the recitation of claim elements, or use of a "negative" limitation.

Without the use of such exclusive terminology, the term "comprising" in claims associated with this disclosure shall allow for the inclusion of any additional element—irrespective of whether a given number of elements are enumerated in such claims, or the addition of a feature could be regarded as transforming the nature of an element set forth in such claims. Except as specifically defined herein, all technical and scientific terms used herein are to be given as broad a commonly understood meaning as possible while maintaining claim validity.

The breadth of the present invention is not to be limited to the examples provided and/or the subject specification, but rather only by the scope of claim language associated with this disclosure.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A display method using a fixed-distance display system, comprising:
   calculating by a processor a head pose and a body pose of the user;
   performing by the processor machine vision optical flow analysis on an image;
   displaying by the fixed-distance display system a body-centric virtual user interface in a field of view of the user based on the head pose of the user relative to the body pose of the user at a fixed distance and in a fixed position relative to the body of the user;
   displaying by the fixed-distance display system the body-centric virtual user interface at the distance and in the position relative to the head of the user that varies with movement of the head of the user such that when the head of the user moves relative to the body of the user, the body-centric virtual user interface moves in the field of view of the user; and
   displaying by the fixed-distance display system three dimensional virtual images having dimensions that do not exceed 0.2 diopters to 0.6 diopters.

2. The method of claim 1, further comprising analyzing by the processor the image to match the field of view of the user to the user's body position.

3. The method of claim 1, wherein the body-centric virtual user interface comprises a plurality of user interface objects displayed in an arc around the body of the user at the fixed distance.

4. The method of claim 3, where the plurality of user interface objects comprises a respective plurality of icons.

5. A method for displaying, comprising:
   calculating a head pose and a body pose of a user;
   performing machine vision optical flow analysis based on an image;

displaying a body-centric virtual user interface in a field of view of the user based on the head pose of the user relative to the body pose of the user at a fixed distance and in a fixed position relative to a body of the user; and displaying three dimensional virtual images having dimensions that do not exceed 0.2 diopters to 0.6 diopters, wherein the body-centric virtual user interface is displayed at a distance and in a position relative to a head of the user that varies with movement of the head of the user such that when the head of the user moves relative to the body of the user, the body-centric virtual user interface moves in the field of view of the user.

6. The method of claim 5, further comprising analyzing by the processor the image to match the field of view of the user to the user's body position.

7. The method of claim 5, wherein the body-centric virtual user interface comprises a plurality of user interface objects displayed in an arc around the body of the user at the fixed distance.

8. The method of claim 7, where the plurality of user interface objects comprises a respective plurality of icons.

9. A fixed-distance display system, comprising:
a light source configured to generate a light beam to form three dimensional virtual images; and
a processor configured to
calculate a head pose and a body pose of a user, and
perform machine vision optical flow analysis based on an image, wherein the fixed-distance display system is configured to display a body-centric virtual user interface in a field of view of the user based on the head pose of the user relative to the body pose of the user, wherein the body-centric virtual user interface is displayed at a distance and in a position relative to a head of the user that varies with movement of the head of the user such that when the head of the user moves relative to the body of the user, the body-centric virtual user interface moves in the field of view of the user, and wherein the fixed-distance display system is configured to display the three dimensional virtual images having dimensions that do not exceed 0.2 diopters to 0.6 diopters.

10. The system of claim 9, wherein the processor is configured to match the field of view of the user to the user's body position.

11. The system of claim 9, wherein the body-centric virtual user interface comprises a plurality of user interface objects displayed in an arc around the body of the user at the fixed distance.

12. The system of claim 11, where the plurality of user interface objects comprises a respective plurality of icons.

* * * * *